(12) United States Patent
Marnfeldt

(10) Patent No.: US 12,440,678 B2
(45) Date of Patent: Oct. 14, 2025

(54) STIMULATION CIRCUITRY IN AN IMPLANTABLE STIMULATOR DEVICE FOR PROVIDING A TISSUE VOLTAGE AS USEFUL DURING NEURAL RESPONSE SENSING

(71) Applicant: Boston Scientific Neuromodulation Corporation, Valencia, CA (US)

(72) Inventor: Goran N. Marnfeldt, Valencia, CA (US)

(73) Assignee: Boston Scientific Neuromodulation Corporation, Valencia, CA (US)

( * ) Notice: Subject to any disclaimer, the term of this patent is extended or adjusted under 35 U.S.C. 154(b) by 417 days.

(21) Appl. No.: 18/049,525

(22) Filed: Oct. 25, 2022

(65) Prior Publication Data

US 2023/0138443 A1     May 4, 2023

Related U.S. Application Data

(60) Provisional application No. 63/263,318, filed on Oct. 29, 2021.

(51) Int. Cl.
*A61N 1/36*      (2006.01)
*A61N 1/02*      (2006.01)

(52) U.S. Cl.
CPC ......... *A61N 1/36125* (2013.01); *A61N 1/025* (2013.01)

(58) Field of Classification Search
CPC ............... A61N 1/36125; A61N 1/025; A61N 1/36062; A61N 1/36135
See application file for complete search history.

(56) References Cited

U.S. PATENT DOCUMENTS

| | | |
|---|---|---|
| 4,811,738 A | 3/1989 | Economides et al. |
| 5,697,958 A | 12/1997 | Paul et al. |
| 5,702,429 A | 12/1997 | King |
| 5,902,236 A | 5/1999 | Iversen |

(Continued)

FOREIGN PATENT DOCUMENTS

| | | |
|---|---|---|
| WO | 95/07114 | 3/1995 |
| WO | 2013/109603 | 7/2013 |

(Continued)

OTHER PUBLICATIONS

H. Mino & J. Rubenstein, "Effects of Neural Refractoriness on Spatio-Temporal Variability in Spike Initiations with Electrical Stimulation," IEEE Trans. on Neural Sys. & Rehabilitation Eng., vol. 14, No. 3, pp. 273-280 (2006).

(Continued)

*Primary Examiner* — Paula J Stice
(74) *Attorney, Agent, or Firm* — Lewis & Reese, PLLC

(57) ABSTRACT

Stimulator circuitry useable in a stimulator device is disclosed. The circuitry includes biasing circuitry that can be used to generate a voltage to allow any one or more electrode on the device (including the case electrode and lead-based electrodes) to provide a common mode voltage (Vcm) to the tissue. Providing a stable Vcm to the tissue is particularly useful when sensing neural responses to the stimulation that the device provides. Switches are provided to couple each of the electrode nodes to one or more buses. This allows any of the electrodes to be selected to provide bipolar or monopolar stimulation, or to act to provide Vcm to the tissue during relevant pulses phases, including during passive charge recovery.

19 Claims, 25 Drawing Sheets

(56) References Cited

U.S. PATENT DOCUMENTS

| | | | |
|---|---|---|---|
| 5,902,249 A | 5/1999 | Lyster | |
| 5,913,882 A | 6/1999 | King | |
| 6,181,969 B1 | 1/2001 | Gord | |
| 6,516,227 B1 | 2/2003 | Meadows et al. | |
| 6,560,490 B2 | 5/2003 | Grill et al. | |
| 7,024,247 B2 | 4/2006 | Gliner et al. | |
| 7,424,322 B2 | 9/2008 | Lombardi et al. | |
| 7,444,181 B2 | 10/2008 | Shi et al. | |
| 7,450,992 B1 | 11/2008 | Cameron | |
| 8,255,057 B2 | 8/2012 | Fang et al. | |
| 8,335,664 B2 | 12/2012 | Eberle | |
| 8,352,030 B2 | 1/2013 | Denison | |
| 8,606,362 B2 | 12/2013 | He et al. | |
| 8,620,436 B2 | 12/2013 | Parramon et al. | |
| 9,044,155 B2 | 6/2015 | Strahl | |
| 9,155,891 B2 | 10/2015 | Archer | |
| 9,155,892 B2 | 10/2015 | Parker et al. | |
| 9,174,051 B2 | 11/2015 | Marnfeldt et al. | |
| 9,248,274 B2 | 2/2016 | Troosters et al. | |
| 9,248,279 B2 | 2/2016 | Chen et al. | |
| 9,259,574 B2 | 2/2016 | Aghassian et al. | |
| 9,265,431 B2 | 2/2016 | Hincapie Ordonez et al. | |
| 9,302,112 B2 | 4/2016 | Bornzin et al. | |
| 9,314,632 B2 | 4/2016 | Marnfeldt et al. | |
| 9,381,356 B2 | 7/2016 | Parker et al. | |
| 9,386,934 B2 | 7/2016 | Parker et al. | |
| 9,403,013 B2 | 8/2016 | Walker et al. | |
| 9,409,020 B2 | 8/2016 | Parker | |
| 9,468,765 B2 | 10/2016 | Archer | |
| 9,526,897 B2 | 12/2016 | Chen et al. | |
| 9,533,148 B2 | 1/2017 | Carcieri et al. | |
| 9,604,061 B2 | 3/2017 | Archer | |
| 9,724,508 B2 | 8/2017 | Lamont et al. | |
| 9,731,116 B2 | 8/2017 | Chen | |
| 9,872,990 B2 | 1/2018 | Parker et al. | |
| 9,974,455 B2 | 5/2018 | Parker et al. | |
| 10,076,667 B2 | 9/2018 | Kaula et al. | |
| 10,391,301 B2 | 8/2019 | Parramon et al. | |
| 10,716,937 B2 | 7/2020 | Feldman et al. | |
| 10,792,491 B2 | 10/2020 | Feldman et al. | |
| 10,881,859 B2 | 1/2021 | Brill et al. | |
| 10,912,942 B2 | 2/2021 | Weerakoon et al. | |
| 11,040,192 B2 | 6/2021 | Weerakoon et al. | |
| 11,040,202 B2 | 6/2021 | Marnfeldt | |
| 2002/0156513 A1 | 10/2002 | Borkan | |
| 2005/0090756 A1 | 4/2005 | Wolf et al. | |
| 2005/0246004 A1 | 11/2005 | Cameron et al. | |
| 2006/0271118 A1 | 11/2006 | Libbus et al. | |
| 2008/0146894 A1 | 6/2008 | Bulkes et al. | |
| 2012/0092031 A1 | 4/2012 | Shi et al. | |
| 2012/0095519 A1 | 4/2012 | Parramon et al. | |
| 2012/0095529 A1 | 4/2012 | Parramon et al. | |
| 2013/0289665 A1 | 10/2013 | Marnfeldt et al. | |
| 2014/0194772 A1 | 7/2014 | Single et al. | |
| 2014/0236042 A1 | 8/2014 | Parker et al. | |
| 2014/0296737 A1 | 10/2014 | Parker et al. | |
| 2015/0080982 A1 | 3/2015 | Funderburk | |
| 2015/0157861 A1 | 6/2015 | Aghassian | |
| 2015/0231402 A1 | 8/2015 | Aghassian | |
| 2015/0282725 A1 | 10/2015 | Single et al. | |
| 2015/0313487 A1 | 11/2015 | Single et al. | |
| 2015/0360038 A1 | 12/2015 | Zottola et al. | |
| 2016/0166164 A1 | 6/2016 | Obradovic et al. | |
| 2016/0287126 A1 | 10/2016 | Parker et al. | |
| 2016/0287182 A1 | 10/2016 | Single et al. | |
| 2017/0049345 A1 | 2/2017 | Single et al. | |
| 2017/0071490 A1 | 3/2017 | Parker et al. | |
| 2017/0135624 A1 | 5/2017 | Parker et al. | |
| 2017/0216587 A1 | 8/2017 | Parker et al. | |
| 2017/0216600 A1 | 8/2017 | Feldman et al. | |
| 2017/0296823 A1 | 10/2017 | Hershey et al. | |
| 2017/0361101 A1 | 12/2017 | Single et al. | |
| 2018/0071520 A1 | 3/2018 | Weerakoon et al. | |
| 2018/0071527 A1 | 3/2018 | Feldman et al. | |
| 2018/0110987 A1 | 4/2018 | Parker et al. | |
| 2018/0117335 A1 | 5/2018 | Parker et al. | |
| 2018/0132747 A1 | 5/2018 | Parker et al. | |
| 2018/0132760 A1 | 5/2018 | Parker et al. | |
| 2018/0133459 A1 | 5/2018 | Parker et al. | |
| 2018/0140831 A1 | 5/2018 | Feldman et al. | |
| 2018/0228391 A1 | 8/2018 | Parker et al. | |
| 2018/0228547 A1 | 8/2018 | Parker et al. | |
| 2018/0256052 A1 | 9/2018 | Parker et al. | |
| 2019/0083796 A1 | 3/2019 | Weerakoon et al. | |
| 2019/0099602 A1 | 4/2019 | Esteller et al. | |
| 2019/0175915 A1 | 6/2019 | Brill et al. | |
| 2019/0209844 A1 | 7/2019 | Esteller et al. | |
| 2019/0275331 A1 | 9/2019 | Zhu et al. | |
| 2019/0290900 A1 | 9/2019 | Esteller et al. | |
| 2019/0299006 A1 | 10/2019 | Marnfeldt et al. | |
| 2019/0366094 A1 | 12/2019 | Esteller et al. | |
| 2020/0155019 A1 | 5/2020 | Esteller et al. | |
| 2020/0305745 A1 | 10/2020 | Wagenbach et al. | |
| 2021/0236829 A1 | 8/2021 | Zhang et al. | |
| 2022/0040486 A1 | 2/2022 | Moffitt | |

FOREIGN PATENT DOCUMENTS

| | | |
|---|---|---|
| WO | 2015/077362 | 5/2015 |
| WO | 2017/100866 | 6/2017 |
| WO | 2017/173493 | 10/2017 |
| WO | 2017/210352 | 12/2017 |
| WO | 2017/219096 | 12/2017 |
| WO | 2020/251899 | 12/2020 |
| WO | 2021/026151 | 2/2021 |

OTHER PUBLICATIONS

M. Moffit et al., A Novel 3-Dimensional Algorithm for Model-Based Programming in Spinal Cord Stimuation (SCS): Illumina-3D™, presentation (2013).

M. Hughes, "Fundamentals of Clinical ECAP Measures in Cochlear Implants: Part 1: Use of the ECAP in Speech Processor Programming (2nd Ed.)," Audiology Online (Nov. 8, 2010) (http://www.audiologyonline.com/articles/fundamentalsclinicalecapmeasuresin846).

I. Akhoun et al., "Electrically evoked compound action potential artifact rejection by independent component analysis: Technique validation," Hearing Research 302, pp. 60-73 (2013).

J. Rubinstein et al., "Pseudospontaneous activity: stochastic independence of auditory nerve fibers with electrical stimulation," Hear Res., 127(1-2), pp. 108-118 (1999) (abstract only).

J. Paz, "Physiological Midline Mapping Based on Spinal Cord Stimulation (SCS) Response Using the 32-Contact Paddle Lead," 19th NANS Annual Meeting (Dec. 13-15, 2015).

E.L. Air et al., "Electrophysiologic Monitoring for Placement of Laminectomy Leads for Spinal Cord Stimulation Under General Anesthesia," Neuromodulation: Technology at the Neural Interface, vol. 15(6), pp. 573-580 (2012).

J.L. Shils et al., "Intraoperative Neurophysiologic Methods for Spinal Cord Stimulator Placement Under General Anesthesia," Neuromodulation: Technology at the Neural Interface, vol. 15(6), pp. 560-572 (2012).

A. Taghva et al., "Intraoperative Electromyography as an Adjunct to Sacral Neuromodulation for Chronic Pelvic Pain," Neuromodulation: Technology at the Neural Interface, vol. 18(1), pp. 62-66 (2015).

International Search Report and Written Opinion regarding corresponding PCT Application No. PCT/US2022/078662, mailed Feb. 10, 2023.

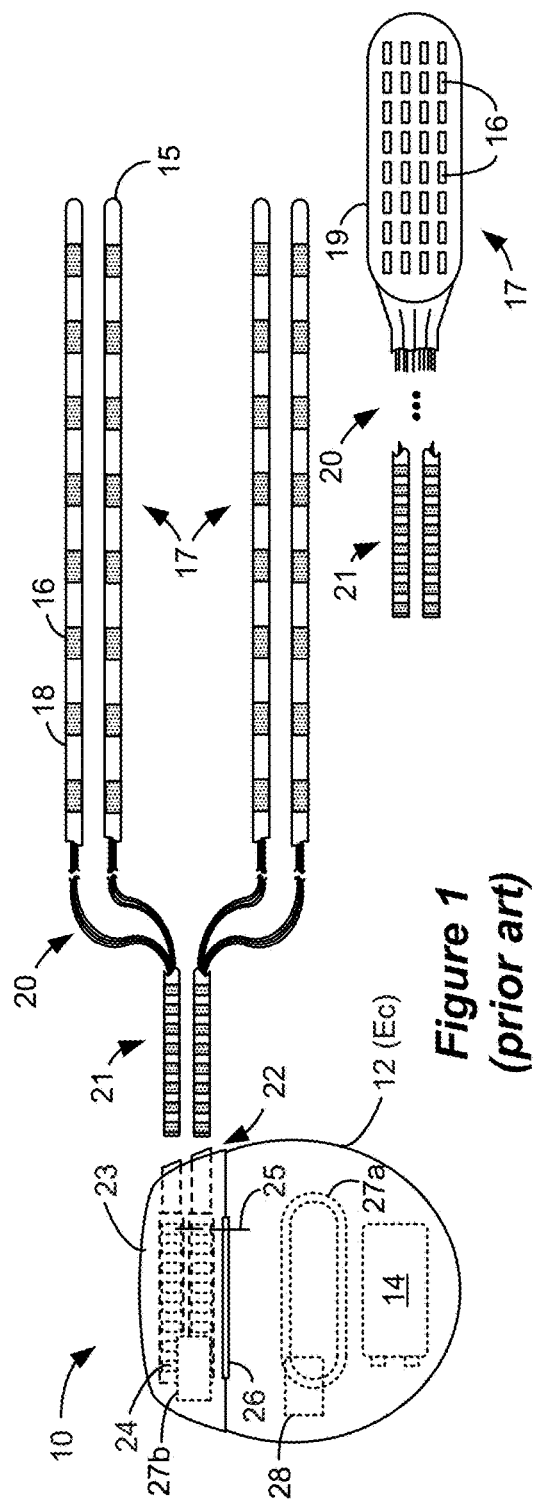
*Figure 1 (prior art)*
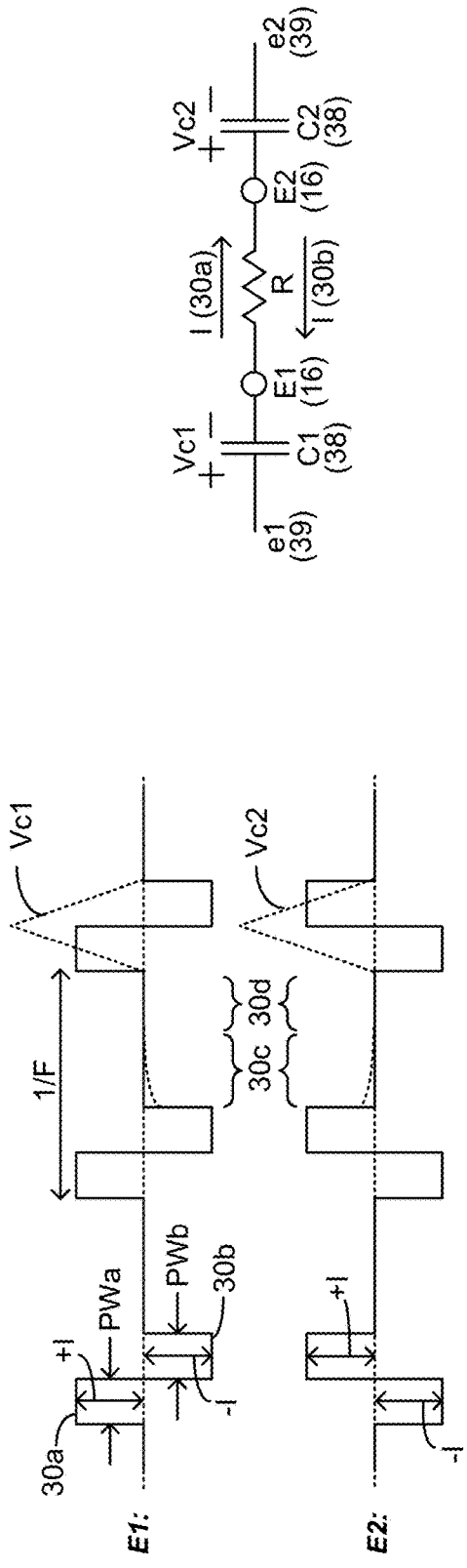
*Figure 2A (prior art)*
*Figure 2B (prior art)*

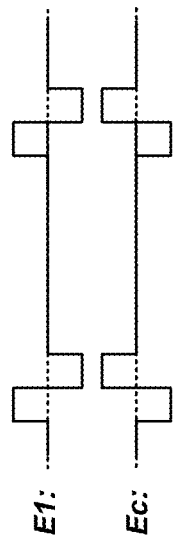
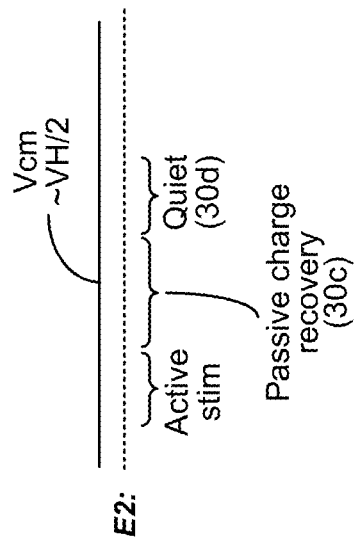

Monopolar stim /
Vcm tissue biasing at electrode E2:

|  | Active stim (Fig. 14B) | Passive recovery (Fig. 14C) | Quiet (Opt 1) (Fig. 14D) | Quiet (Opt 2) (Fig. 14E) |
|---|---|---|---|---|
| P/NDAC1 | active | inactive | inactive | inactive |
| P/NDAC2 | inactive | inactive | inactive | inactive |
| P/NDACc | active | inactive | inactive | inactive |
| PR1 | open | closed | open | open |
| PR2 | open | open | open | closed |
| PRc | open | closed | open | closed |
| CM1 | open | open | open | open |
| CM2 | closed | closed | closed | closed |
| CMc | open | open | open | open |

*Figure 14A*

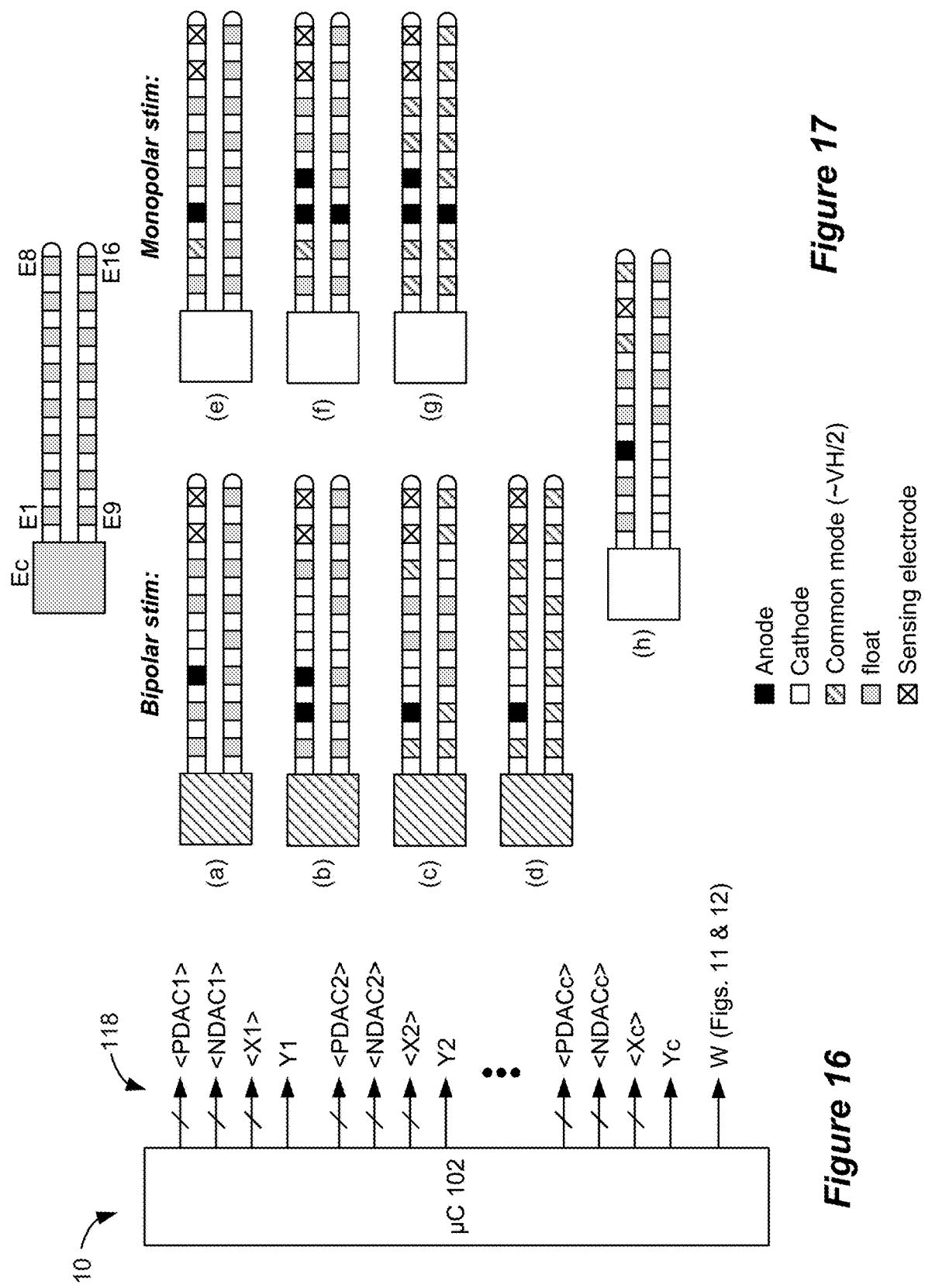

STIMULATION CIRCUITRY IN AN IMPLANTABLE STIMULATOR DEVICE FOR PROVIDING A TISSUE VOLTAGE AS USEFUL DURING NEURAL RESPONSE SENSING

CROSS REFERENCE TO RELATED APPLICATIONS

This is a non-provisional application of U.S. Provisional Patent Application Ser. No. 63/263,318, filed Oct. 29, 2021, to which priority is claimed, and which is incorporated herein by reference in its entirety.

FIELD OF THE INVENTION

This application relates to Implantable Medical Devices (IMDs), and more specifically to circuitry to assist with sensing neural responses to stimulation in an implantable stimulator device.

INTRODUCTION

Implantable neurostimulator devices are devices that generate and deliver electrical stimuli to body nerves and tissues for the therapy of various biological disorders, such as pacemakers to treat cardiac arrhythmia, defibrillators to treat cardiac fibrillation, cochlear stimulators to treat deafness, retinal stimulators to treat blindness, muscle stimulators to produce coordinated limb movement, spinal cord stimulators to treat chronic pain, cortical and deep brain stimulators to treat motor and psychological disorders, and other neural stimulators to treat urinary incontinence, sleep apnea, shoulder subluxation, etc. The description that follows will generally focus on the use of the invention within a Spinal Cord Stimulation (SCS) or Deep Brain Stimulation (DBS) system. However, the present invention may find applicability with any stimulator device system.

A stimulator system typically includes an Implantable Pulse Generator (IPG) 10 shown in FIG. 1. The IPG 10 includes a biocompatible device case 12 that holds the circuitry and a battery 14 for providing power for the IPG to function. The IPG 10 is coupled to tissue-stimulating electrodes 16 via one or more electrode leads that form an electrode array 17. For example, one or more percutaneous leads 15 can be used having ring-shaped or split-ring electrodes 16 carried on a flexible body 18. In another example, a paddle lead 19 provides electrodes 16 positioned on one of its generally flat surfaces. Lead wires 20 within the leads are coupled to the electrodes 16 and to proximal contacts 21 insertable into lead connectors 22 fixed in a header 23 on the IPG 10, which header can comprise an epoxy for example. Once inserted, the proximal contacts 21 connect to header contacts 24 within the lead connectors 22, which are in turn coupled by feedthrough pins 25 through a case feedthrough 26 to stimulation circuitry 28 within the case 12.

In the illustrated IPG 10, there are thirty-two electrodes (E1-E32), split between four percutaneous leads 15, or contained on a single paddle lead 19, and thus the header 23 may include a 2x2 array of eight-electrode lead connectors 22. However, the type and number of leads, and the number of electrodes, in an IPG is application specific and therefore can vary. The conductive case 12, or some conductive portion of the case, can also comprise an electrode (Ec). In an SCS application, the electrode lead(s) are typically implanted in the spinal column proximate to the dura in a patient's spinal cord, preferably spanning left and right of the patient's spinal column. The proximal contacts 21 are tunneled through the patient's tissue to a distant location such as the buttocks where the IPG case 12 is implanted, at which point they are coupled to the lead connectors 22. In a DBS application, the electrode leads are implanted in the brain through holes in the skull, and lead extension are used to connect the leads to the IPG which is typically implanted under the clavicle (collarbone). In other IPG examples designed for implantation directly at a site requiring stimulation, the IPG can be lead-less, having electrodes 16 instead appearing on the body of the IPG 10 for contacting the patient's tissue. The IPG lead(s) can be integrated with and permanently connected to the IPG 10 in other solutions. SCS therapy can relieve symptoms such as chronic back pain, while DBS therapy can alleviate Parkinsonian symptoms such as tremor and rigidity.

IPG 10 can include an antenna 27a allowing it to communicate bi-directionally with a number of external devices discussed subsequently. Antenna 27a as shown comprises a conductive coil within the case 12, although the coil antenna 27a can also appear in the header 23. When antenna 27a is configured as a coil, communication with external devices preferably occurs using near-field magnetic induction. IPG 10 may also include a Radio-Frequency (RF) antenna 27b. In FIG. 1, RF antenna 27b is shown within the header 23, but it may also be within the case 12. RF antenna 27b may comprise a patch, slot, or wire, and may operate as a monopole or dipole. RF antenna 27b preferably communicates using far-field electromagnetic waves, and may operate in accordance with any number of known RF communication standards, such as Bluetooth, Zigbee, WiFi, MICS, and the like.

Stimulation in IPG 10 is typically provided by pulses each of which may include a number of phases ($30i$), as shown in the example of FIG. 2A. Stimulation parameters typically include amplitude (current I, although a voltage amplitude V can also be used); frequency (F); pulse width (PW); the electrodes 16 selected to provide the stimulation; and the polarity of such selected electrodes, i.e., whether they act as anodes that source current to the tissue or cathodes that sink current from the tissue. These and possibly other stimulation parameters taken together comprise a stimulation program that the stimulation circuitry 28 in the IPG 10 can execute to provide therapeutic stimulation to a patient.

In the example of FIG. 2A, electrode E1 has been selected as an anode (during its first phase 30a), and thus provides pulses which source a positive current of amplitude +I to the tissue. Electrode E2 has been selected as a cathode (again during first phase 30a), and thus provides pulses which sink a corresponding negative current of amplitude -I from the tissue. This is an example of bipolar stimulation, in which the lead includes one anode pole and one cathode pole. Note that more than one electrode on the lead may be selected to act as an anode electrode to form an anode pole at a given time, and more than one electrode may be selected to act as a cathode to form a cathode pole at a given time, as explained further in U.S. Pat. No. 10,881,859. Stimulation provided by the IPG 10 can also be monopolar, although this example is not yet shown. In monopolar stimulation, the lead is programmed with a single pole of a given polarity (e.g., a cathode pole), with the conductive case electrode Ec acting as a return (e.g., an anode pole). Again, more than one electrode on the lead may be active to form the pole during monopolar stimulation.

IPG 10 as mentioned includes stimulation circuitry 28 to form prescribed stimulation at a patient's tissue. FIG. 3 shows an example of stimulation circuitry 28, which includes one or more current source circuits and one or more current sink circuits. The sources and sinks can comprise Digital-to-Analog converters (DACs), and may be referred to as PDACs and NDACs in accordance with the Positive (sourced, anodic) and Negative (sunk, cathodic) currents they respectively issue. In the example shown, a NDACi/ PDACi pair is dedicated (hardwired) to a particular electrode node ei 39. Each electrode node ei 39 is connected to an electrode Ei 16 via a DC-blocking capacitor Ci 38, for the reasons explained below. The stimulation circuitry 28 in this example also supports selection of the conductive case 12 as an electrode (Ec 12), which case electrode is typically selected for monopolar stimulation as explained above. PDACs and NDACs can also comprise voltage sources.

Proper control of the PDACs and NDACs allows any of the electrodes 16 to act as anodes or cathodes to create a current through a patient's tissue, R, hopefully with good therapeutic effect. Consistent with the example provided in FIG. 2A, FIG. 3 shows operation during the first phase 30a in which electrode E1 has been selected as an anode electrode to source current Ito the tissue R and E2 has been selected as a cathode electrode to sink current from the tissue. Thus PDAC1 and NDAC2 are digitally programmed to produce the desired current, I, with the correct timing (e.g., in accordance with the prescribed frequency and pulse widths). As mentioned above, more than one anode electrode and more than one cathode electrode may be selected at one time, and thus current can flow through the tissue R between two or more of the electrodes 16.

Other stimulation circuitries 28 can also be used in the IPG 10. In an example not shown, a switching matrix can intervene between the one or more PDACs and the electrode nodes ei 39, and between the one or more NDACs and the electrode nodes. Switching matrices allows any PDAC or NDAC to be connected to any of the electrode nodes. Various examples of stimulation circuitries can be found in U.S. Pat. Nos. 6,181,969, 8,606,362, 8,620,436, 11,040,192, and 10,912,942. Much of the stimulation circuitry 28 of FIG. 3, including the PDACs and NDACs, the switch matrices (if present), and the electrode nodes ei 39 can be integrated on one or more Application Specific Integrated Circuits (ASICs), as described in U.S. Patent Application Publications 2012/0095529, 2012/0092031, and 2012/0095519. As explained in these references, ASIC(s) may also contain other circuitry useful in the IPG 10, such as IPG master control circuitry 102 (see FIG. 5), telemetry circuitry (for interfacing off chip with telemetry antennas 27a and/or 27b), circuitry for generating the compliance voltage VH (as explained next), various measurement circuits, etc.

Power for the stimulation circuitry 28 is provided by a compliance voltage VH, as described in further detail in U.S. Patent Application Publications 2013/0289665 and 2018/ 0071520. The compliance voltage VH may be coupled to the source circuitry (e.g., the PDAC(s)), while ground may be coupled to the sink circuitry (e.g., the NDAC(s)), such that the stimulation circuitry 28 is powered by VH and ground. Other power supply voltages may be used with the PDACs and NDACs, and explained in U.S. Patent Application Publication 2018/0071520, but these aren't shown in FIG. 3 for simplicity.

Preferably, and as described in U.S. Pat. No. 11,040,202, the compliance voltage VH can be produced by a VH regulator 49. VH regulator 49 receives the voltage of the battery 14 (Vbat) and boosts this voltage to a higher value required for the compliance voltage VH. VH regulator 49 can comprise an inductor-based boost converter or a capacitor-based charge pump for example. The regulator 49 can vary the value of VH based on measurements taken from the stimulation circuitry 28. As explained in detail in the '202 patent, VH measurement circuitry 51 can be used to measure the voltage drops across the active DACs (e.g., PDAC1 (Vp1) and NDAC2 (Vn2) in the example shown in FIG. 3) in the stimulation circuitry 28. Using such measurements allows VH to be established at an energy-efficient level: high enough to form the prescribed current without loading (i.e., without producing less current that prescribed), yet low enough to not needlessly waste power in the stimulation circuitry 28 when forming the prescribed current.

The VH measurement circuitry 51 can output an enable signal VH(en1) indicating when VH regulator 49 should increase the level of VH, i.e., when the voltage drops across the active DACs are too low. This enable signal VH(en1) may be processed at logic 53 in conjunction with other signals explained below to determine a master enable signal VH(en) for the VH regulator 49. Logic 53 may be associated with the IPG's control circuitry 102. Master enable signal VH(en) when asserted causes the VH regulator 49 to increase VH (e.g., when the current starts to load). Deasserting VH(en) disables the VH regulator, which allows VH to naturally decrease over time until it needs to be increased again. This feedback generally causes VH to be established at an energy-efficient value appropriate for the current that is being provided by the stimulation circuitry 28.

Also shown in FIG. 3 are DC-blocking capacitors Ci 38 placed in series in the electrode current paths between each of the electrode nodes ei 39 and the electrodes Ei 16 (including the case electrode Ec 12). The DC-blocking capacitors 38 act as a safety measure to prevent DC current injection into the patient, as could occur for example if there is a circuit fault in the stimulation circuitry 28. The DC-blocking capacitors 38 are typically provided off-chip (off of the ASIC(s)), and instead may be provided in or on a circuit board in the IPG 10 used to integrate its various components, as explained in U.S. Patent Application Publication 2015/ 0157861.

Referring again to FIG. 2A, the stimulation pulses as shown are biphasic, with each pulse comprising a first phase 30a followed thereafter by a second phase 30b of opposite polarity. Biphasic pulses are useful to actively recover any charge that might be stored on capacitive elements in the electrode current paths, such as on the DC-blocking capacitors 38. Charge recovery is shown with reference to both FIGS. 2A and 2B. During the first pulse phase 30a, charge will (primarily) build up across the DC-blockings capacitors C1 and C2 associated with the electrodes E1 and E2 used to produce the current, giving rise to voltages Vc1 and Vc2 (I=C*dV/dt). During the second pulse phase 30b, when the polarity of the current I is reversed at the selected electrodes E1 and E2, the stored charge on capacitors C1 and C2 is recovered, and thus voltages Vc1 and Vc2 hopefully return to 0V at the end the second pulse phase 30b. To recover all charge by the end of the second pulse phase 30b of each pulse (Vc1=Vc2=0V), the first and second phases 30a and 30b are charged balanced at each electrode, with the phases comprising an equal amount of charge but of the opposite polarity. In the example shown, such charge balancing is achieved by using the same pulse width (PWa =PWb) and the same amplitude (|+I|=|−I|) for each of the pulse phases 30a and 30b. However, the pulse phases 30a and 30b may also be charged balance if the product of the amplitude and pulse widths of the two phases 30a and 30b are equal, as is known.

Charge recovery using phases 30a and 30b is said to be "active" because the P/NDACs in stimulation circuitry 28 actively drive a current, in particular during the last phase 30b to recover charge stored after the first phase 30a. However, such active charge recovery may not be perfect, and some residual charge may be present in capacitive structures even after phase 30b is completed. Accordingly, the stimulation circuitry 28 can also provide for passive charge recovery. Passive charge recovery is implemented using passive charge recovery switches PRi 41 as shown in FIG. 3. These switches 41 when selected via assertion of control signals <Xi> couple each electrode node ei to a passive recovery voltage Vpr established on bus 43. As explained in U.S. Pat. Nos. 10,716,937 and 10,792,491, this allows any stored charge to be passively recovered through the patient's tissue, R, without actively driving currents using the P/NDACs. Control signals <Xi> are usually asserted to cause passive charge recovery after each pulse (e.g., after each last phase 30b) during periods 30c shown in FIG. 2A. Because passive charge recovery involves capacitive discharge through the resistance R of the patient's tissue, such discharge manifests as an exponential decay in current, as shown in FIG. 2A.

As also discussed in the -937 patent, each of the passive charge recovery switches 41 can be associated with a variable resistance, and as such each switch 41 can be controlled by a bus of signals <Xi> to control the resistance at which passive charge recovery occurs—i.e., the on resistance of the switches 41 when they are closed. Note that the common voltage Vpr used during passive charge recovery can comprise ground, VH, VH/2, the voltage of the battery 14 (Vbat), or any other DC voltage provided by the IPG 10, and any number of generator circuits (not shown) can be used to produce these voltages for Vpr. Passive charge recovery during period 30c may be followed by a quiet period 30d during which no active current is driven by the DAC circuitry, and none of the passive recovery switches 41 are closed. This quiet period 30d may last until the next pulse is actively produced (e.g., phase 30a). Like the particulars of pulse phases 30a and 30b, the occurrence of passive charge recovery (30c) and any quiet periods (30d) can be prescribed as part of the stimulation program.

Although not illustrated, the pulses provided by the IPG 10 may also be single-phase (i.e., monophasic) pulses having a single polarity, and thus may lack a second (opposite polarity) pulse phase that provides active charge recovery. Performing passive charge recovery can be more important when monophasic pulses are used, and indeed may be required, as discussed further later.

FIG. 4 shows various external systems 60, 70, and 80 that can wirelessly communicate data with the IPG 10 (which again can include an ETS). Such systems can be used to wirelessly transmit a stimulation program to the IPG 10—that is, to program its stimulation circuitry 28 to produce stimulation with desired amplitudes and timings as described earlier. Such systems may also be used to adjust one or more stimulation parameters of a stimulation program that the IPG 10 is currently executing, and/or to wirelessly receive information from the IPG 10, such as various status information, etc.

External controller 60 can be as described in U.S. Patent Application Publication 2015/0080982 for example, and may comprise a portable, hand-held controller dedicated to work with the IPG 10. External controller 60 may also comprise a general-purpose mobile electronics device such as a mobile phone which has been programmed with a Medical Device Application (MDA) allowing it to work as a wireless controller for the IPG 10, as described in U.S. Patent Application Publication 2015/0231402. External controller 60 includes a display 61 and a means for entering commands, such as buttons 62 or selectable graphical icons provided on the display 61. The external controller 60's user interface enables a patient to adjust stimulation parameters, although it may have limited functionality when compared to systems 70 and 80, described shortly. The external controller 60 can have one or more antennas capable of communicating with the IPG 10. For example, the external controller 60 can have a near-field magnetic-induction coil antenna 64a capable of wirelessly communicating with the coil antenna 27a in the IPG 10. The external controller 60 can also have a far-field RF antenna 64b capable of wirelessly communicating with the RF antenna 27b in the IPG 10.

Clinician programmer 70 is described further in U.S. Patent Application Publication 2015/0360038, and can comprise a computing device such as a desktop, laptop, or notebook computer, a tablet, a mobile smart phone, a Personal Data Assistant (PDA)-type mobile computing device, etc. In FIG. 4, the computing device is shown as a laptop computer that includes typical computer user interface means such as a display 71, buttons 72, as well as other user-interface devices such as a mouse, a keyboard, speakers, a stylus, a printer, etc., not all of which are shown for convenience. Also shown in FIG. 4 are accessory devices for the clinician programmer 70 that are usually specific to its operation as a stimulation controller, such as a communication "wand" 76 coupleable to suitable ports on the computing device. The antenna used in the clinician programmer 70 to communicate with the IPG 10 can depend on the type of antennas included in the IPG 10. If the patient's IPG 10 includes a coil antenna 27a, wand 76 can likewise include a coil antenna 74a to establish near-field magnetic-induction communications at small distances. In this instance, the wand 76 may be affixed in close proximity to the patient, such as by placing the wand 76 in a belt or holster wearable by the patient and proximate to the patient's IPG 10. If the IPG 10 includes an RF antenna 27b, the wand 76, the computing device, or both, can likewise include an RF antenna 74b to establish communication with the IPG 10 at larger distances. The clinician programmer 70 can also communicate with other devices and networks, such as the Internet, either wirelessly or via a wired link provided at an Ethernet or network port.

External system 80 comprises another means of communicating with and controlling the IPG 10 via a network 85 which can include the Internet. The network 85 can include a server 86 programmed with communication and control functionality, and may include other communication networks or links such as WiFi, cellular or land-line phone links, etc. The network 85 ultimately connects to an intermediary device 82 having antennas suitable for communication with the IPG's antenna, such as a near-field magnetic-induction coil antenna 84a and/or a far-field RF antenna 84b. Intermediary device 82 may be located generally proximate to the IPG 10. Network 85 can be accessed by any user terminal 87, which typically comprises a computer device associated with a display 88. External system 80 allows a remote user at terminal 87 to communicate with and control the IPG 10 via the intermediary device 82.

FIG. 4 also shows circuitry 90 involved in any of external systems 60, 70, or 80. Such circuitry can include control circuitry 92, which can comprise any number of devices such as one or more microprocessors, microcomputers, FPGAs, DSPs, other digital logic structures, etc., which are capable of executing programs in a computing device. Such control circuitry 92 may contain or coupled with memory 94 which can store external system software 96 for controlling and communicating with the IPG 10, and for rendering a Graphical User Interface (GUI) 99 on a display (61, 71, 88) associated with the external system. In external system 80, the external system software 96 would likely reside in the server 86, while the control circuitry 92 could be present in either or both the server 86 or the terminal 87.

SUMMARY

A stimulator device is disclosed that is configured to provide stimulation with a first phase and a second phase. The stimulator device may comprise: a plurality of electrode nodes, wherein each of the electrode nodes is coupleable to a different electrode configured to contact a patient's tissue; driver circuitry configurable to drive at least two of the electrode nodes during the first phase to provide a current through the tissue; a first bus configured to receive a bias voltage from biasing circuitry; a plurality of first switches, wherein each of the first switches is connected between a different one of the electrode nodes and the first bus; a second bus; a plurality of second switches, wherein each of the second switches is connected between a different one of the electrode nodes and the second bus; and control circuitry configured to close at least one of the first switches to provide a common mode voltage to the tissue, and close the second switches connected to the at least two electrode nodes during the second phase.

In one example, the second phase comprises a passive recovery phase to recover charge stored in current paths of the at least two electrodes. In one example, the device further comprises a plurality of DC-blocking capacitors, wherein each of the DC-blocking capacitors is connected in series between one of the electrode nodes and a different one of the electrodes. In one example, the device further comprises a resistor in parallel across only one of the DC-blocking capacitors. In one example, the control circuitry is configured to close only one of the first switches, wherein the only one first switch is connected to the DC-blocking capacitor having the resistor in parallel.

In one example, one of the electrodes comprises a case electrode, wherein the case electrode is connected to the DC-blocking capacitor having the resistor in parallel. In one example, the control circuitry is further configured to open the second switches during the first phase. In one example, the control circuitry is further configured to close the at least one of the first switches during the second phase to provide the common mode voltage to the tissue. In one example, the control circuitry is further configured to close the at least one of the first switches during the first phase to provide the common mode voltage to the tissue. In one example, the stimulation further comprises a third phase, wherein the control circuitry is further configured to close the at least one of the first switches during the third phase to provide the common mode voltage to the tissue. In one example, the third phase comprises a quite phase when the driver circuitry is not active. In one example, the control circuitry is further configured to open the second switches during the third phase. In one example, the control circuitry is configured during the third phase to close second switches connected to the electrode nodes connected to the at least one of the first switches, and to close at least one second switch connected to at least one of the two electrode nodes. In one example, the second bus is not biased by circuitry during the second phase. In one example, the stimulation comprises a plurality of phases during the first phase. In one example, the stimulation is biphasic during the first phase comprising two phases of opposite polarities. In one example, the stimulation is monophasic during the first phase. In one example, the device further comprises a case implantable in the tissue and comprising a conductive portion, wherein one of the electrodes comprises the conductive portion operating as a case electrode. In one example, the device further comprises at least one lead, wherein at least some of the electrodes are on the at least one lead operating as lead-based electrodes. In one example, the stimulation is monopolar during the first phase to provide the current between the case electrode and at least one of the lead-based electrodes. In one example, the common mode voltage is provided to the tissue at one or more of the lead-based electrodes. In one example, the stimulation is bipolar during the first phase to provide the current between at least two of the lead-based electrodes. In one example, the common mode voltage is provided to the tissue at the case electrode. In one example, the driver circuitry is powered by a compliance voltage. In one example, the bias voltage comprises approximately one half of the compliance voltage. In one example, the driver circuitry provides a constant current through the tissue. In one example, the driver circuitry comprises source circuitry to source the constant current to the tissue and sink circuitry to sink the constant current from the tissue. In one example, the driver circuitry comprises a plurality of source and sink pairs, wherein each of the source and sink pairs is connected to one of the electrode nodes. In one example, the device further comprises neural response detection circuitry coupled to the electrode nodes, wherein the neural response detection circuitry is configured to measure a neural response to the current at one or more of the electrode nodes. In one example, the one or more of the electrode nodes at which the neural response is measured are different from at least two of the electrode nodes driven during the first phase to provide the current through the tissue.

A stimulator device is disclosed that is configured to provide stimulation with a first phase and a second phase. The stimulator device may comprise: a plurality of electrode nodes, wherein each of the electrode nodes is coupleable to a different electrode configured to contact a patient's tissue; driver circuitry configurable to drive at least two of the electrode nodes during the first phase to provide a current through the tissue; a first bus configured to receive a bias voltage from biasing circuitry; a plurality of first switches, wherein each of the first switches is connected between a different one of the electrode nodes and the first bus; a second bus; a plurality of second switches, wherein each of the second switches is connected between a different one of the electrode nodes and the second bus; a third switch connected between the first bus and the second bus.

In one example, the device may further comprise control circuitry, wherein the control circuitry is configured during the second phase to close the second switches connected to the at least two electrode nodes to recover charge stored in current paths of the at least two electrode nodes, and issue a control signal to either open or close the third switch. In one example, the device further comprises a plurality of DC-blocking capacitors, wherein each of the DC-blocking capacitors is connected in series between one of the electrode nodes and a different one of the electrodes. In one example, the device further comprising a resistor in parallel across only one of the DC-blocking capacitors. In one example, if the control circuitry issues the control signal to open the third switch, the control circuitry is further configured during the second phase to close at least one of the first switches to provide a common mode voltage to the tissue. In one example, the second bus is not biased by circuitry during the second phase when the third switch is opened. In one example, the stimulation further comprises a third phase, wherein the control circuitry is further configured to close the at least one of the first switches during the first phase, during the third phase, or during both the first phase and the third phase, to provide the common mode voltage to the tissue. In one example, the third phase comprises a quite phase when the driver circuitry is not active. In one example, the control circuitry is configured to open the second switches during the first phase, the third phase, or during both the first phase and the third phase. In one example, the device further comprises a case implantable in the tissue and comprising a conductive portion, wherein one of the electrodes comprises the conductive portion operating as a case electrode. In one example, the device further comprises at least one lead, wherein at least some of the electrodes are on the at least one lead operating as lead-based electrodes. In one example, the stimulation is monopolar during the first phase to provide the current between the case electrode and at least one of the lead-based electrodes. In one example, the common mode voltage is provided to the tissue at one or more of the lead-based electrodes. In one example, the stimulation is bipolar during the first phase to provide the current between at least two of the lead-based electrodes. In one example, the common mode voltage is provided to the tissue at the case electrode. In one example, if the control circuitry issues the control signal to close the third switch, the control circuitry is further configured during the second phase to open all of the first switches to prevent a common mode voltage from forming in the tissue during the second phase. In one example, the stimulation further comprises a third phase, wherein the third phase comprises a quite phase when the driver circuitry is not active. In one example, the control circuitry is further configured to close at least one of the first switches during the first phase, during the third phase, or during both the first phase and the third phase, to provide the common mode voltage to the tissue. In one example, the control circuitry is further configured to open all of the first switches during the first phase, the third phase, or during both the first phase and the third phase. In one example, the control circuitry is configured to open the second switches during the first phase, during the third phase, or during both the first phase and the third phase. In one example, the stimulation comprises a plurality of phases during the first phase. In one example, the stimulation is biphasic during the first phase comprising two phases of opposite polarities. In one example, the stimulation is monophasic during the first phase. In one example, the driver circuitry is powered by a compliance voltage. In one example, the bias voltage comprises approximately one half of the compliance voltage. In one example, the driver circuitry provides a constant current through the tissue. In one example, the driver circuitry comprises source circuitry to source the constant current to the tissue and sink circuitry to sink the constant current from the tissue. In one example, the driver circuitry comprises a plurality of source and sink pairs, wherein each of the source and sink pairs is connected to one of the electrode nodes. In one example, the device further comprises neural response detection circuitry coupled to the electrode nodes, wherein the neural response detection circuitry is configured to measure a neural response to the current at one or more of the electrode nodes. In one example, the one or more of the electrode nodes at which the neural response is measured are different from at least two of the electrode nodes driven during the first phase to provide the current through the tissue.

A stimulator device is disclosed that is configured to provide stimulation with a first phase and a second phase. The stimulator device may comprise: a plurality of electrode nodes, wherein each of the electrode nodes is coupleable to a different electrode configured to contact a patient's tissue; driver circuitry configurable to drive at least two of the electrode nodes during the first phase to provide a current through the tissue; a bus configured to receive a bias voltage from biasing circuitry; a plurality of switches, wherein each of the switches is connected between a different one of the electrode nodes and the bus; and control circuitry configured to close at least one first of the switches during the first phase to provide a common mode voltage to the tissue, and open the at least one first switch during the second phase, and close second of the switches connected to the at least two electrode nodes during the second phase.

In one example, the second phase comprises a passive recovery phase to recover charge stored in current paths of the at least two electrodes. In one example, the device further comprises a plurality of DC-blocking capacitors, wherein each of the DC-blocking capacitors is connected in series between one of the electrode nodes and a different one of the electrodes. In one example, the device further comprises a resistor in parallel across only one of the DC-blocking capacitors. In one example, the control circuitry is configured to close only one first switch, wherein the only one first switch is connected to the DC-blocking capacitor having the resistor in parallel. In one example, one of the electrodes comprises a case electrode, wherein the case electrode is connected to the DC-blocking capacitor having the resistor in parallel. In one example, the control circuitry is further configured to open the second switches during the first phase. In one example, the stimulation further comprises a third phase, wherein during the third phase the control circuitry is configured to close the at least one first switch to provide the common mode voltage to the tissue. In one example, the third phase comprises a quite phase when the driver circuitry is not active. In one example, during the third phase the control circuitry is configured to open the second switches. In one example, the stimulation comprises a plurality of phases during the first phase. In one example, the stimulation is biphasic during the first phase comprising two phases of opposite polarities. In one example, the stimulation is monophasic during the first phase. In one example, the device further comprises a case implantable in the tissue and comprising a conductive portion, wherein one of the electrodes comprises the conductive portion operating as a case electrode. In one example, the device further comprises at least one lead, wherein at least some of the electrodes are on the at least one lead operating as lead-based electrodes. In one example, the stimulation is monopolar during the first phase to provide the current between the case electrode and at least one of the lead-based electrodes. In one example, the common mode voltage is provided to the tissue at one or more of the lead-based electrodes. In one example, the stimulation is bipolar during the first phase to provide the current between at least two of the lead-based electrodes. In one example, the common mode voltage is provided to the tissue at the case electrode. In one example, the driver circuitry is powered by a compliance voltage. In one example, the bias voltage comprises approximately one half of the compliance voltage. In one example, the driver circuitry provides a constant current through the tissue. In one example, the driver circuitry comprises source circuitry to source the constant current to the tissue and sink circuitry to sink the constant current from the tissue. In one example, the driver circuitry comprises a plurality of source and sink pairs, wherein each of the source and sink pairs is connected to one of the electrode nodes. In one example, the device further comprises neural response detection circuitry coupled to the electrode nodes, wherein the neural response detection circuitry is configured to measure a neural response to the current at one or more of the electrode nodes. In one example, the one or more of the electrode nodes at which the neural response is measured are different from at least two of the electrode nodes driven during the first phase to provide the current through the tissue.

BRIEF DESCRIPTION OF THE DRAWINGS

FIG. 1 shows an Implantable Pulse Generator (IPG), in accordance with the prior art.

FIGS. 2A and 2B show an example of stimulation pulses producible by the IPG, in accordance with the prior art.

FIG. 5 shows an improved IPG having neural response sensing capability.

FIG. 6 shows stimulation producing a neural response, and the sensing of that neural response at least one electrode of the IPG.

FIGS. 14A-14E show operation of the stimulation circuitry of FIG. 11 when providing monopolar stimulation, and describes configuration of the circuitry during various pulses phases.

FIG. 16 shows generation of the control signals that control the disclosed stimulation circuitry.

FIG. 17 shows how the disclosed stimulation circuitry can be used to designate any electrode, including the case electrode, as an active electrode to provide stimulation; as an electrode to provide Vcm to the tissue; or as a sensing electrode to sense neural responses to the stimulation.

DETAILED DESCRIPTION

Figure 3:
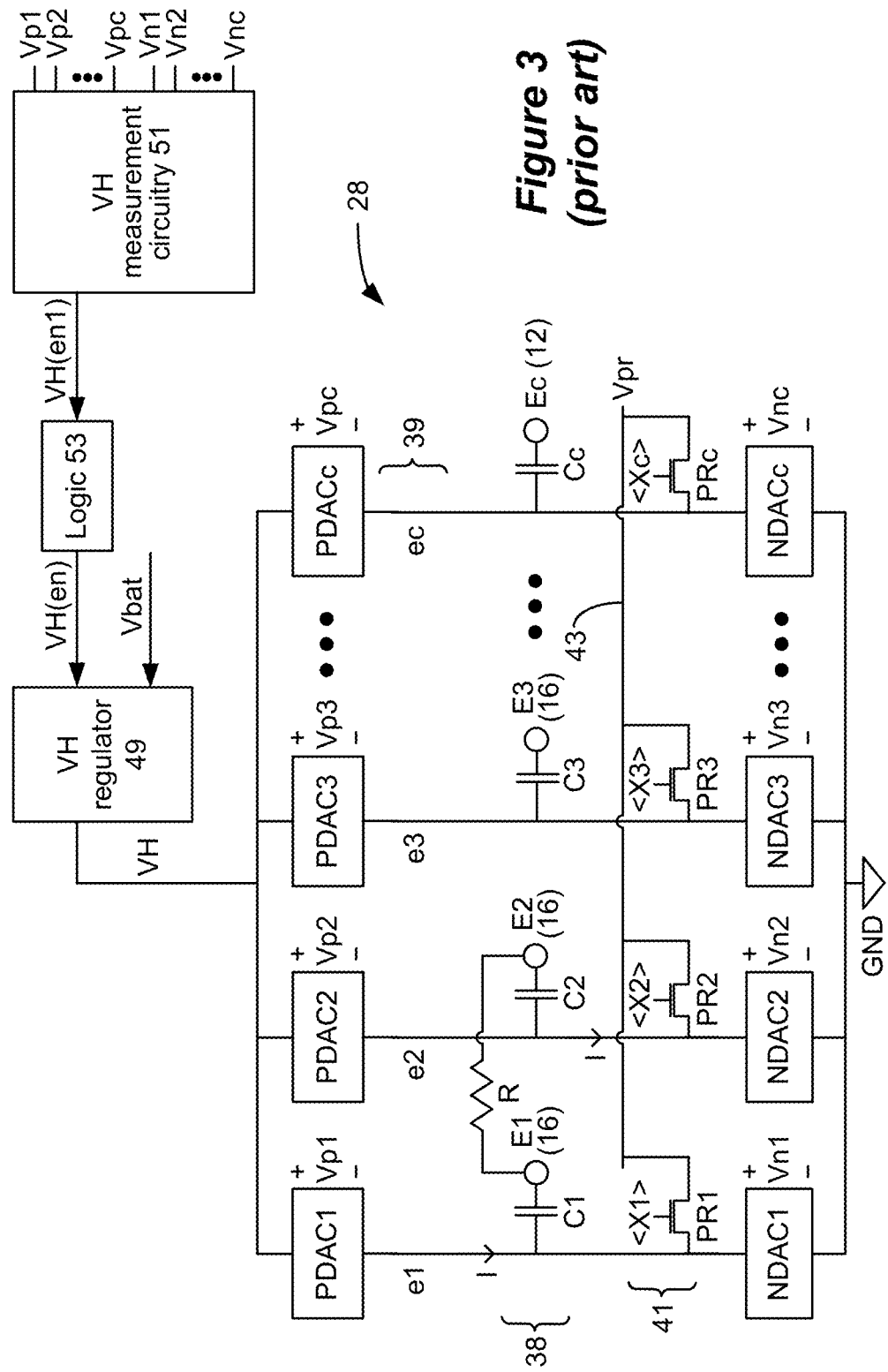
FIG. 3 shows stimulation circuitry useable in the IPG, in accordance with the prior art.

An increasingly interesting development in pulse generator systems is the addition of sensing capability to complement the stimulation that such systems provide. For example, and as explained in U.S. Patent Application Publication 2017/0296823, it can be beneficial to sense a neural response produced by neural tissue that has received stimulation from an IPG. U.S. Patent Application Publication 2017/0296823 shows an example where sensing of neural responses is useful in an SCS context, and in particular discusses the sensing of Evoked Compound Action Potentials, or "ECAPs." U.S. Patent Application Publication 2022/0040486 shows an example where sensing of neural responses is useful in a DBS context, and in particular discusses the sensing of Evoked Resonant Neural Activity, or "ERNA."

Figures 5, 6:
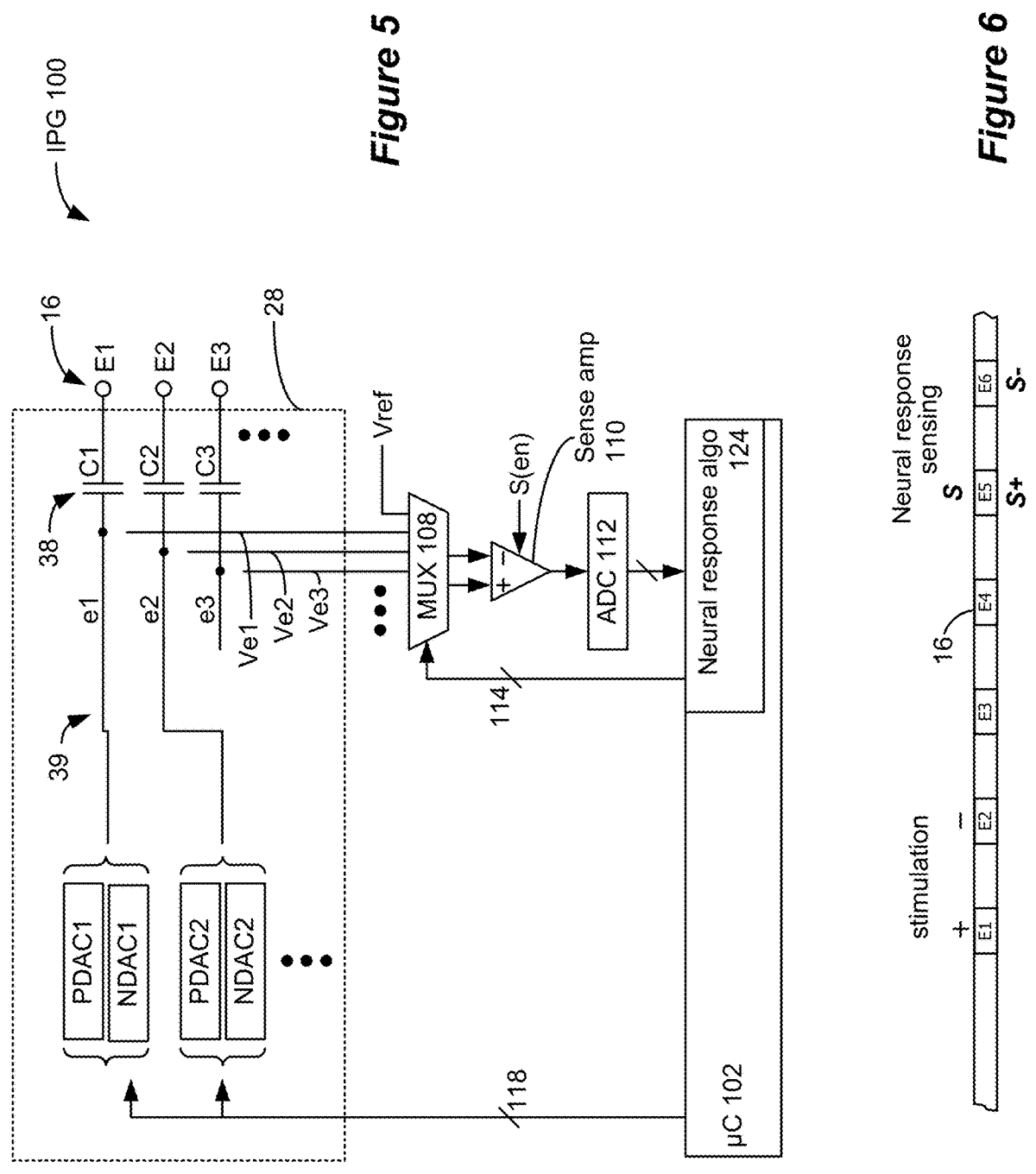

FIG. 5 shows circuitry for sensing neural responses in an IPG 10. The IPG 10 includes control circuitry 102, which may comprise a microcontroller for example, such as Part Number MSP430, manufactured by Texas Instruments, which is described in data sheets accessible on the Internet. Other types of control circuitry may be used in lieu of a microcontroller as well, such as microprocessors, FPGAs, DSPs, or combinations of these, etc. Control circuitry 102 may also be formed in whole or in part in one or more Application Specific Integrated Circuits (ASICs) in the IPG 10 as described earlier, which ASIC(s) may additionally include the other circuitry shown in FIG. 5.

FIG. 5 includes the stimulation circuitry 28 described earlier (FIG. 3), including one or more DACs (PDACs and NDACs). A bus 118 provides digital control signals to the DACs to produce currents or voltages of prescribed amplitudes and with the correct timing at the electrodes selected for stimulation. The electrode current paths to the electrodes 16 include the DC-blocking capacitors 38 described earlier.

Figure 4:
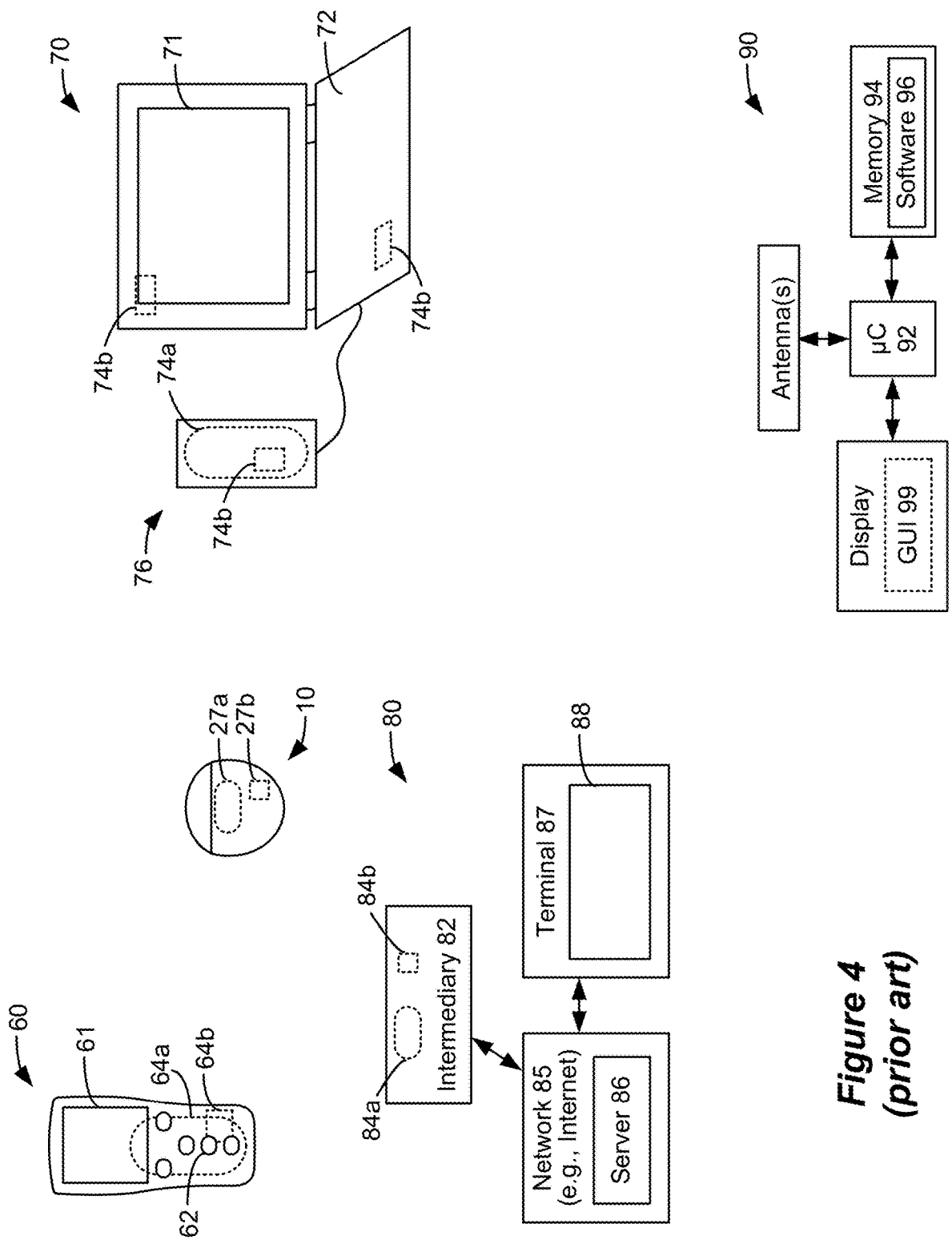
FIG. 4 shows various external devices capable of communicating with and programming stimulation in an IPG, in accordance with the prior art.

FIG. 5 also shows circuitry used to detect neural responses. As shown, the electrode nodes 39 are input to a multiplexer (MUX) 108. The MUX 108 is control by a bus 114, which operates to select one or more electrode nodes, and hence to designate corresponding electrodes 16 as sensing electrodes. The sensing electrode(s) selected via bus 114 can be determined automatically by control circuitry 102 and/or a neural response algorithm 124, as described further below. However, the sensing electrode(s) may also be selected by the user (e.g., a clinician) via an external system (FIG. 4).

Electrodes selected as sensing electrodes are provided by the MUX 108 to neural response detection circuitry. This circuitry can comprise a sense amplifier 110, and sensing can occur differentially using two sensing electrodes, or using a single sensing electrode. This is shown in the example of FIG. 6. If single-ended sensing is used, a single electrode (e.g., E5) is selected as a sensing electrode (S) and is provided to the positive terminal of the sense amp 110, where it is compared to a reference voltage Vref provided to the negative input. The reference voltage Vref can comprise any DC voltage produced within the IPG, such as ground. If differential sensing is used, two electrodes (e.g., E5 and E6) are selected as sensing electrodes (S+ and S−) by the MUX 108, with one electrode (e.g., E5) provided to the positive terminal of the sense amp 110, and the other (e.g., E6) provided to the negative terminal. Differential sensing can be useful to cancel any common mode voltages present in the tissue and reflected at the electrodes, such as voltages created by the stimulation itself. See, e.g., U.S. Patent Application Publication 2021/0236829. Although only one sense amp 110 is shown in FIG. 5 for simplicity, there could be more than one, such as a sense amp dedicated to each electrode node. In this case, MUX 108 would not be necessary, and each sense amp could be activated as needed depending on which electrodes are selected as sensing electrodes. The timing at which sensing occurs can be affected by a sensing enable signal S(en), as discussed further below.

The analog waveform comprising the sensed neural response and output by the sense amp 110 is preferably converted to digital signals by an Analog-to-Digital converter (ADC) 112, and input to the IPG's control circuitry 102. The ADC 112 can be included within the control circuitry 102's input stage as well. The control circuitry 102 can be programmed with a neural response algorithm 124 to evaluate the neural response, and to take appropriate actions as a result. For example, the neural response algorithm 124 may change the stimulation in accordance with the sensed neural response, and can issue new control signals via bus 118 to change operation of the stimulation circuitry 28 to affect better treatment for the patient. The neural response algorithm 124 may also cause the selection of new sensing electrode(s), which can be affected by issuing new control signals on bus 114. Selecting optimal sensing electrode(s) can be important, and may be determined in light of stimulation that is being provided. In this regard, sensing electrodes may be selected near enough to the electrodes providing stimulation (e.g., E1 and E2) to allow for proper neural response sensing, but far enough from the stimulation that the stimulation doesn't substantially interfere with neural response sensing. See, e.g., U.S. Patent Application Publication 2020/0155019.

Neural responses to stimulation are typically small-amplitude signals on the order of microVolts or milliVolts, which can make sensing difficult. The sense amp 110 needs to be capable of resolving this small signal, and this is particularly difficult when one realizes that this small signal typically rides on a background voltage otherwise present in the tissue. As explained in U.S. Pat. No. 11,040,202, which is incorporated by reference in its entirety, this background voltage can vary on the order of Volts, and can be caused by the stimulation itself. It is difficult to design sense amplifier circuitry 110 to reliably perform the task of accurately sensing a small-signal neural response while rejecting the background tissue voltage. Because stimulation causes the background tissue voltage to vary, it is preferred that neural responses are sensed after active stimulation is provided. Thus, sensing enable signal S(en) is preferably asserted during these times. That being said, stimulation artifacts resulting from the stimulation may still be present and cause variations in the tissue voltage even after stimulation has ceased. See, e.g., PCT (Int'l) Patent Application Publication WO 2020/251899.

Figure 7:
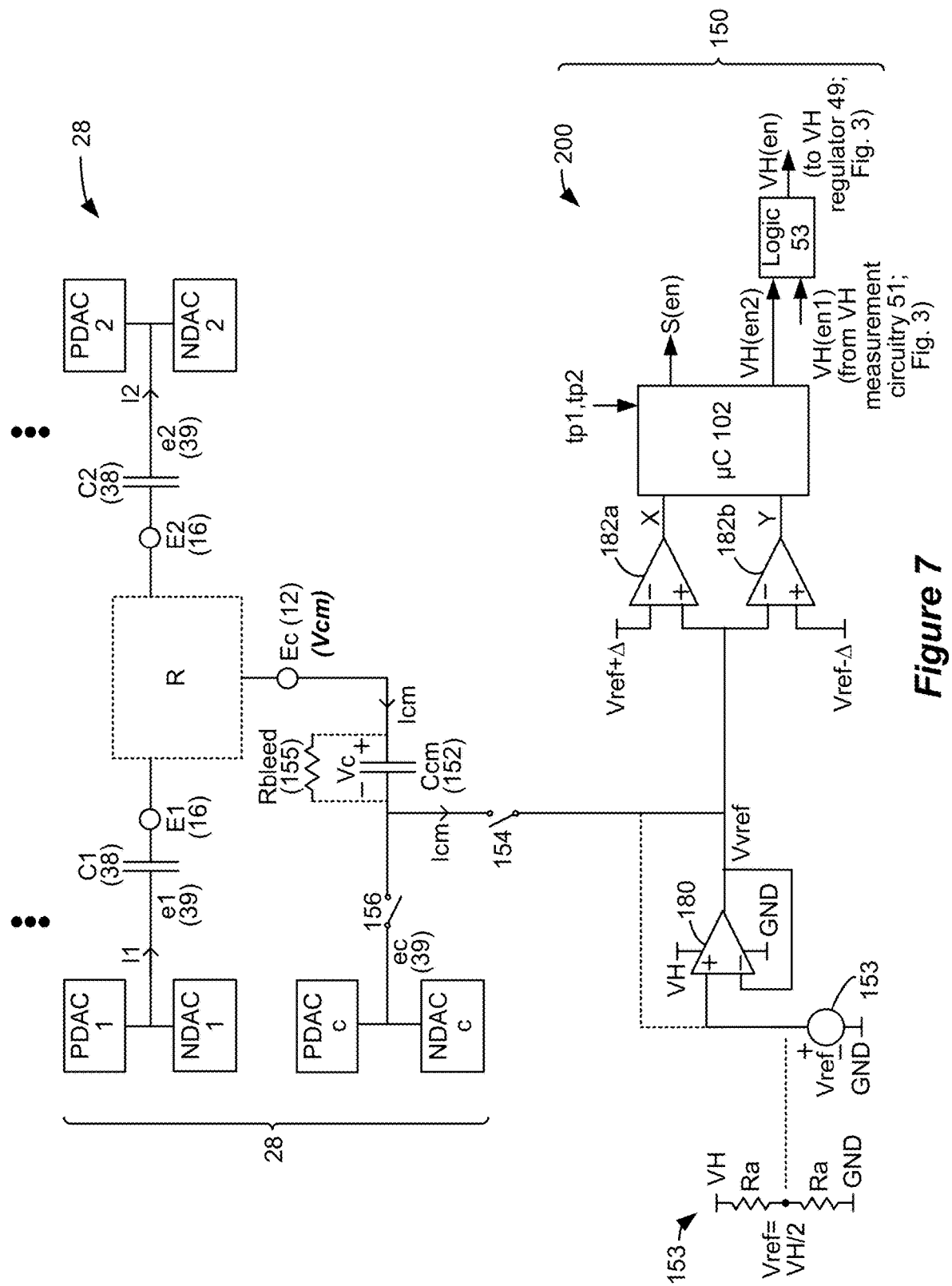
FIG. 7 shows biasing circuitry useable to set a common mode voltage Vcm to the patient's tissue, preferably using the IPG's case electrode.

The above-incorporated '202 patent addresses this issue of background tissue voltage variability by adding additional circuitry to the IPG 10 to hold the tissue to a pseudo-constant common mode voltage (Vcm). FIG. 7 shows details of the circuitry from the '202 patent with some elaboration, and because familiarity with this circuitry is assumed and is explained in detail in the '202 patent, the circuitry in FIG. 7 is only briefly discussed.

FIG. 7 includes tissue biasing circuitry 150, which is used to hold the tissue R to a common mode Vcm using the case electrode Ec. The case electrode Ec is particularly useful for providing the common mode voltage Vcm: a patient's tissue is of relatively low resistance, and conductive portions of the IPG's case 12 are relatively large in area and thus also low in resistance. Therefore, even if the case electrode Ec is implanted at a distance from the lead-based electrodes 16 used for stimulation and sensing, the case electrode Ec still comprises a suitable means for establishing Vcm for the whole of the tissue.

FIG. 7 also shows the stimulation circuitry 28 described earlier, although only a portion is shown for simplicity. Specifically, FIG. 7 shows portions of the stimulation circuitry 28 used to actively drive a current at lead-based electrodes E1 and E2 (P/NDAC1, P/NDAC2) and at the case electrode Ec (P/NDACc). Portions used to drive currents at other electrodes (E3, E4, etc.) are not shown.

The tissue biasing circuitry 150 passively biases the case electrode Ec to Vcm using a capacitor Ccm 152 and a voltage source 153 inside the case 12. In the example shown in FIG. 7, the capacitor Ccm 152 serves a dual function: its acts as a common mode capacitance to assist in setting Vcm at the case electrode Ec when tissue biasing circuitry 150 is active, and also acts as a DC blocking capacitor (see 38, FIG. 3) when the case electrode Ec is actively driven (during monopolar stimulation) using the stimulation circuitry 28 (using PDACc and/or NDACc). Switches 156 and 154 can facilitate these different uses of the case electrode Ec. When the stimulation circuitry 28 is used to drive the case electrode Ec, switch 156 is closed to couple the relevant DAC circuitry (PDACc and NDACc) to Ccm 152, while switch 154 is open to disconnect the tissue biasing circuitry 150. By contrast, when the tissue biasing circuitry 150 is used to passively form Vcm at the case electrode Ec, switch 154 is closed, and switch 156 is opened to disconnect the stimulation circuitry 28.

The voltage source 153 produces a reference voltage Vref, which may be adjustable. Vref preferably has a value between ground (0V) and the compliance voltage (VH), or is equal to these values. Vref may also have a value that varies as a function of the compliance voltage VH, which as noted earlier may vary by operation of VH regulator 49 (FIG. 3). Most preferably, and as assumed from this point forward, Vref may be set to VH/2, and hence may vary as VH varies. A voltage source 153 producing VH/2 as shown in FIG. 7 may be formed as a VH voltage divider comprising high-resistance resistors Ra and Rb each having the same high value, although other generator circuits could be used to form Vref as well.

The common mode voltage Vcm established in the tissue R at the case electrode Ec comprises the sum of Vref (or Vvref as discussed further below) and any voltage formed across capacitor Ccm 152 (Vc). As explained in the '202 patent, Vc can form when a current Icm flow to the case electrode Ec, such as when the stimulation circuitry 28 is imbalanced. Consider the example in FIG. 7, where a current I1 is being sourced to the tissue R through electrode E1, and a current I2 is being sunk from the tissue through electrode E2. (FIG. 2A, first phase 30a). Normally, these currents I1 and I2 would be prescribed to have the same value, and thus ideally Icm would be zero. This means capacitor Ccm 152 would not charge (Vc 32 0), and hence the common mode voltage Vcm would be set to Vref=VH/2 at the case electrode Ec. However, these currents I1 and I2 may be slightly imbalanced. If |I1|>|I2|, because PDAC1 is stronger than NDAC2, Icm would be positive, causing Vc to increase over time, which sets Vcm>Vref. If |I1|<|I2|, because NDAC2 is stronger than PDAC1, Icm would be negative, causing Vc to decrease over time, which sets Vcm<Vref. As such, Vcm is pseudo constant. Adjusting Vcm using Icm is sensible because Vcm is brought closer to voltages formed in the tissue during the issuance of the stimulation pulses, which are also affected by any imbalance of the currents formed by the stimulation circuitry 28.

In any event, once Vcm is established at the case electrode Ec and hence in the tissue R, voltages otherwise formed in the tissue, such as those accompanying the production of stimulation pulses, will be established relative to Vcm. This can ease sensing of small signals in the tissue at the sense amp 110, such as the neural responses explained above.

FIG. 7 also shows an optional bleed resistor Rbleed 155 included in parallel with the capacitor Ccm 152. The bleed resistor Rbleed 155 is preferably of a high resistance (e.g., 1 MegaOhm or higher), and allows charge to bleed slowly off the capacitor Ccm, for example, during periods when the tissue biasing circuitry 150 is not being used. Furthermore, Rbleed can assist with current balancing. By permitting a small current to flow, Rbleed acts to boost the weaker DAC, which may allow current balancing to happen before the stronger DAC becomes loaded, as explained in the '202 patent. Notice that Rbleed allows a DC current to flow from the IPG 10's circuitry to the tissue R, and thus the case electrode Ec does not perfectly block DC current. As discussed above, DC blocking using capacitors at each electrode in contact with the tissue R is preferred for safety. However, because all other potential current paths to the tissue R (E1, E2, etc.) include DC blocking capacitors (C1, C2, etc.), the DC current at the case electrode Ec must equal zero. See, e.g., U.S. Pat. No. 10,391,301. Thus, DC currents are still effectively blocked at all electrode current paths, including the case electrode Ec, despite the use of Rbleed.

The above-incorporated '202 patent discloses other optional circuitry that can be included in the tissue biasing circuitry 150. For example, circuitry 150 can include an amplifier 180. Amplifier 180 is preferably an operational transconductance amplifier (OTA), which produces a virtual reference Vvref on the bottom plate of capacitor Ccm 152. Details are explained further in the '202 patent, but to summarize here, the OTA 180 limits Icm to between +Iout (max) and −Iout(min) producible at the output of the OTA 180. This is beneficial, because limiting Icm through the tissue limits "pocket stimulation," which can be caused when unwanted current flows to the tissue pocket where the case electrode Ec is implanted. Pocket stimulation may be felt by the patient, or may otherwise negatively affect therapy provided by the selected lead-based electrodes, and so is generally undesirable. Note that use of OTA 180 is not strictly required, and instead the voltage source 153's output Vref (e.g., VH/2) can be connected (e.g., via switch 154) to the bottom plate of capacitor Ccm 152, as shown in the dotted lines in FIG. 7 (in which case Vvref simply equals Vref).

Still other optional circuitry within tissue biasing circuitry 150 is shown in FIG. 7, including monitoring circuitry 200. Again, this circuitry 200 is discussed in detail in the above-incorporated '202 patent, and is only briefly summarized here. Monitoring circuitry 200 receives the virtual reference Vvref as an input, from which a couple of things can be determined. First, monitoring Vvref allows the control circuitry 102 in the IPG 10 to decide when neural response sensing is best performed in the IPG 10, i.e., when the sensing enable signal S(en) should be asserted (see FIG. 5). Second, monitoring Vvref is also useful in determining whether the compliance voltage VH should be increased, i.e., when enable signal VH(en2) should be asserted.

Both of these determinations depend on how significantly the virtual reference Vvref varies from the reference voltage Vref (e.g., VH/2) output by the voltage source 153. In this regard, Vvref is input to a window comparator formed from comparators 182a and 182b, which sets a voltage window from Vref+Δ to Vref−Δ (where Δ may equal 100 mV for example). If Vvref is higher than Vref+Δ, signal X is asserted. If Vvref is lower than Vref−Δ, signal Y is asserted. The control circuitry 102 in the IPG 100 can assess X and Y in conjunction with timing control signals tp1 or tp2 that indicate whether stimulation is occurring during the first or second of pulse phases 30a and 30b. As explained in the '202 patent, sensing enable signal S(en) is asserted only when control signals X and Y are not asserted, meaning that Vvref is between Vref+Δ and Vref−Δ. Enable signal VH(en2)—indicating a need to increase VH at the VH regulator 49—is asserted if only X is asserted during one phase pulse phase (e.g., 30a), and if only Y is asserted during the other phase (e.g., 30b). Note that VH(en2) can be input to logic 53 (FIG. 3) to decide whether the master enable signal VH(en) should issue to the VH generator 49 to increase VH. Logic 53 can as explained earlier can also receive other signals relevant to whether VH should be increased, such as VH(en1) from the VH measurement circuitry 51 (FIG. 3). Logic 53 can for example perform a logical OR operation, thus enabling the VH generator 49 to increase VH per VH(en) if either VH(en1) (from VH measurement circuitry 51, FIG. 3) or VH(en2) (from monitoring circuitry 200) is asserted. Logic 53 as mentioned earlier may be associated with control circuitry 102 in the IPG 10, although it is shown separately in FIG. 7 for convenience.

Figure 8:
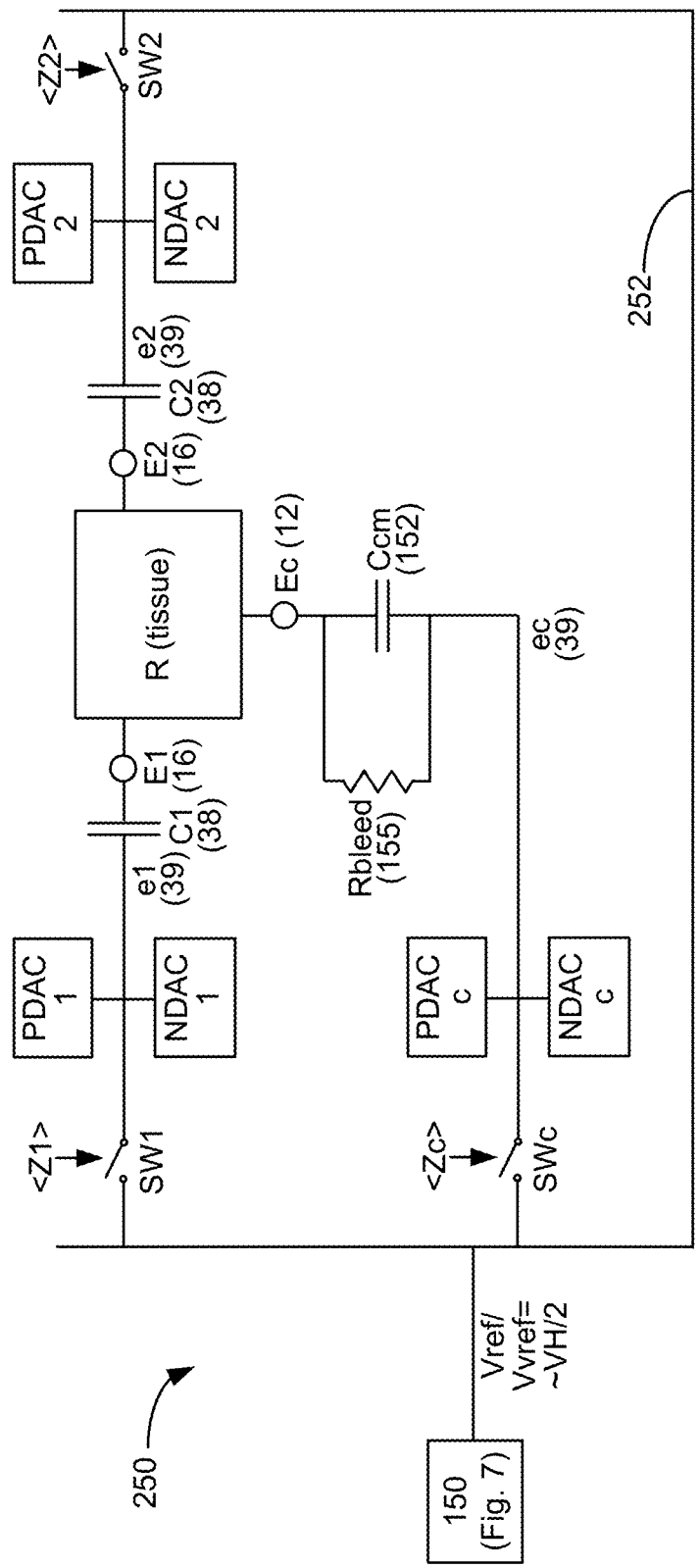
FIG. 8 shows a first example of stimulation circuitry using switches and a single bus driven by the biasing circuitry to both provide a voltage to set Vcm in the tissue and to provide passive charge recovery.
Figure 9A:
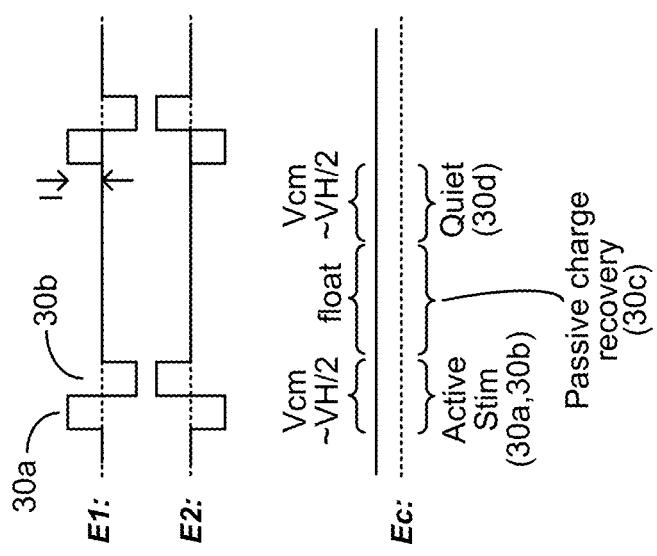
FIGS. 9A-9D show operation of the stimulation circuitry of FIG. 8 when providing bipolar stimulation, and describes configuration of the circuitry during various pulses phases.
Figure 9B:
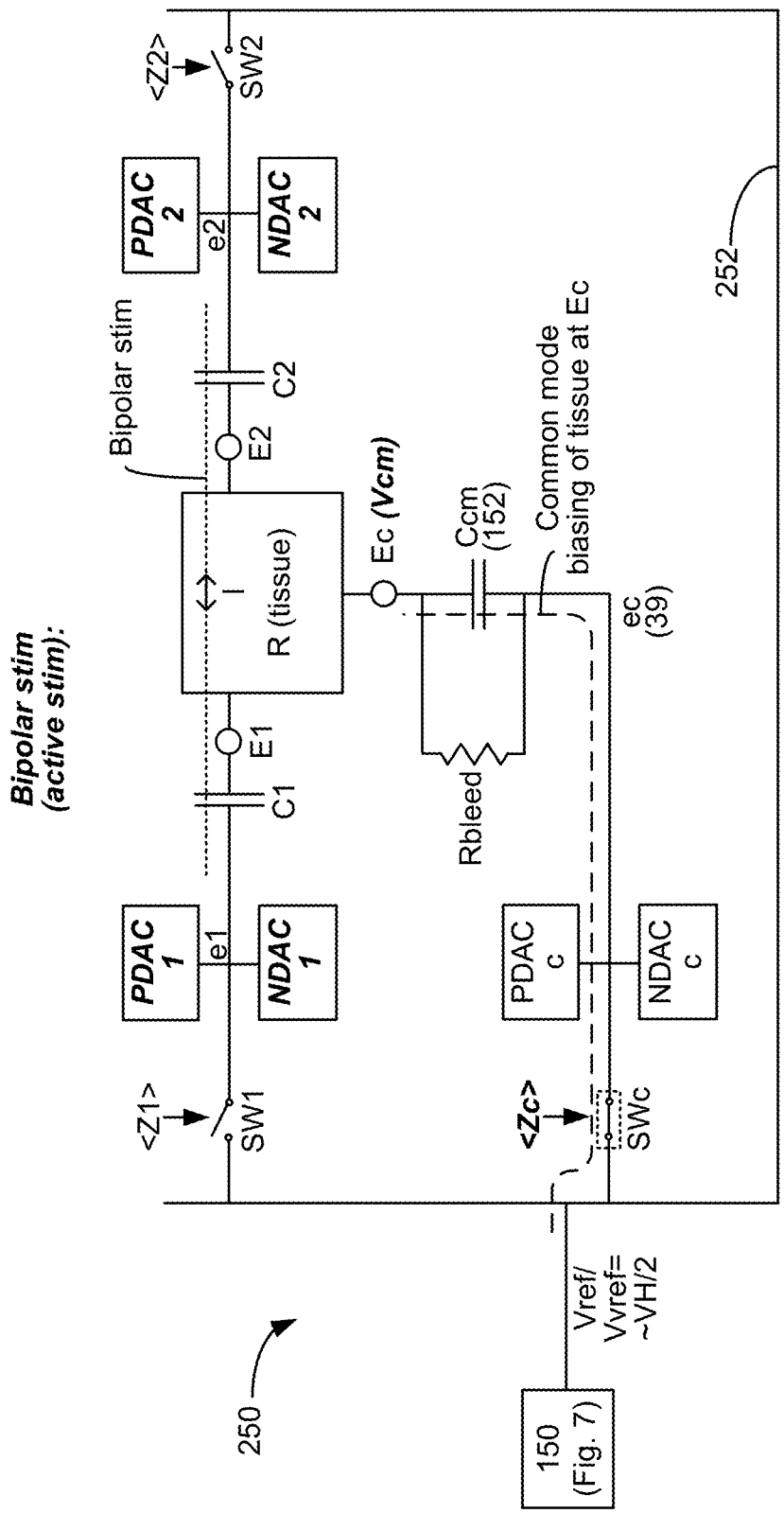
Figure 9C:
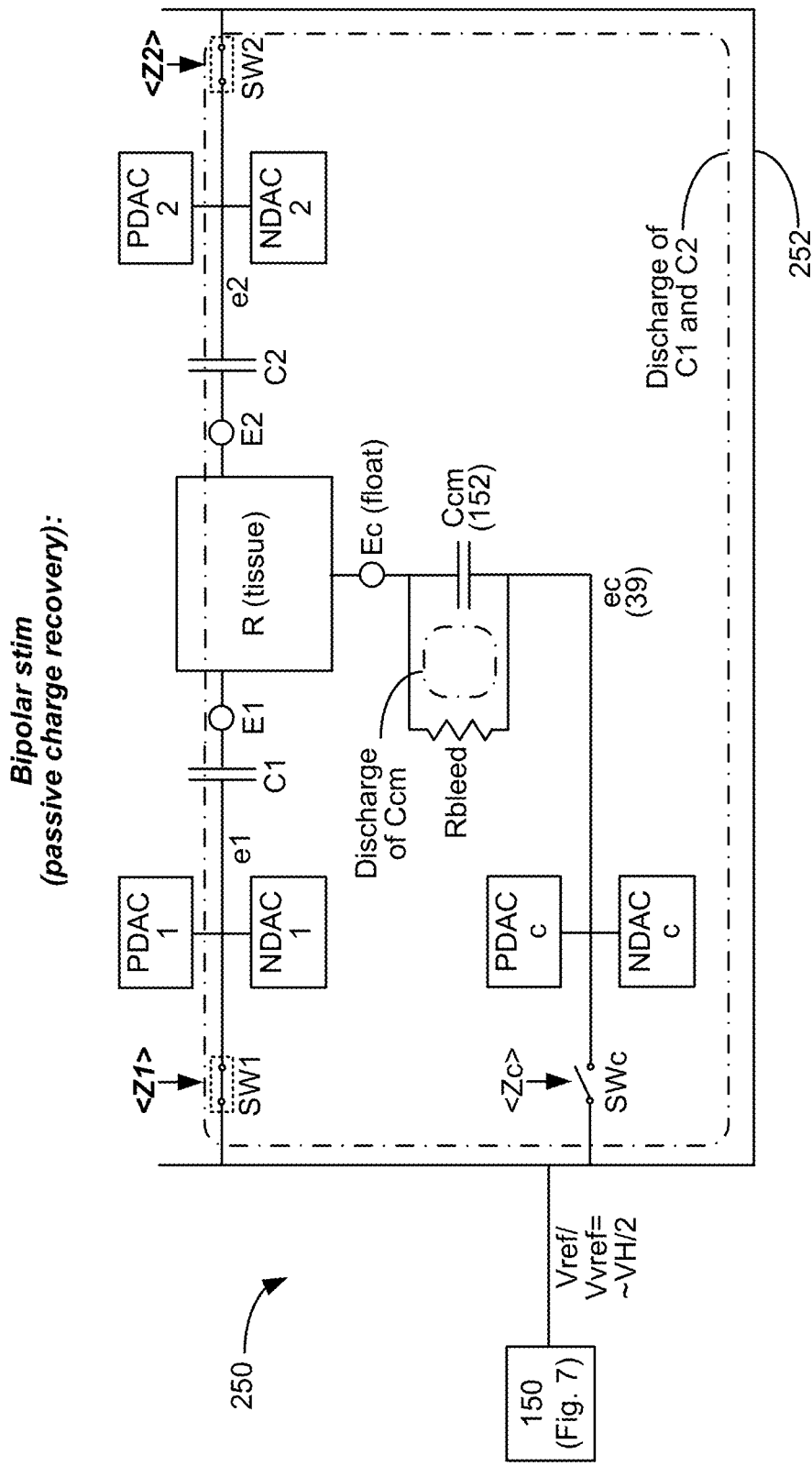
Figure 9D:
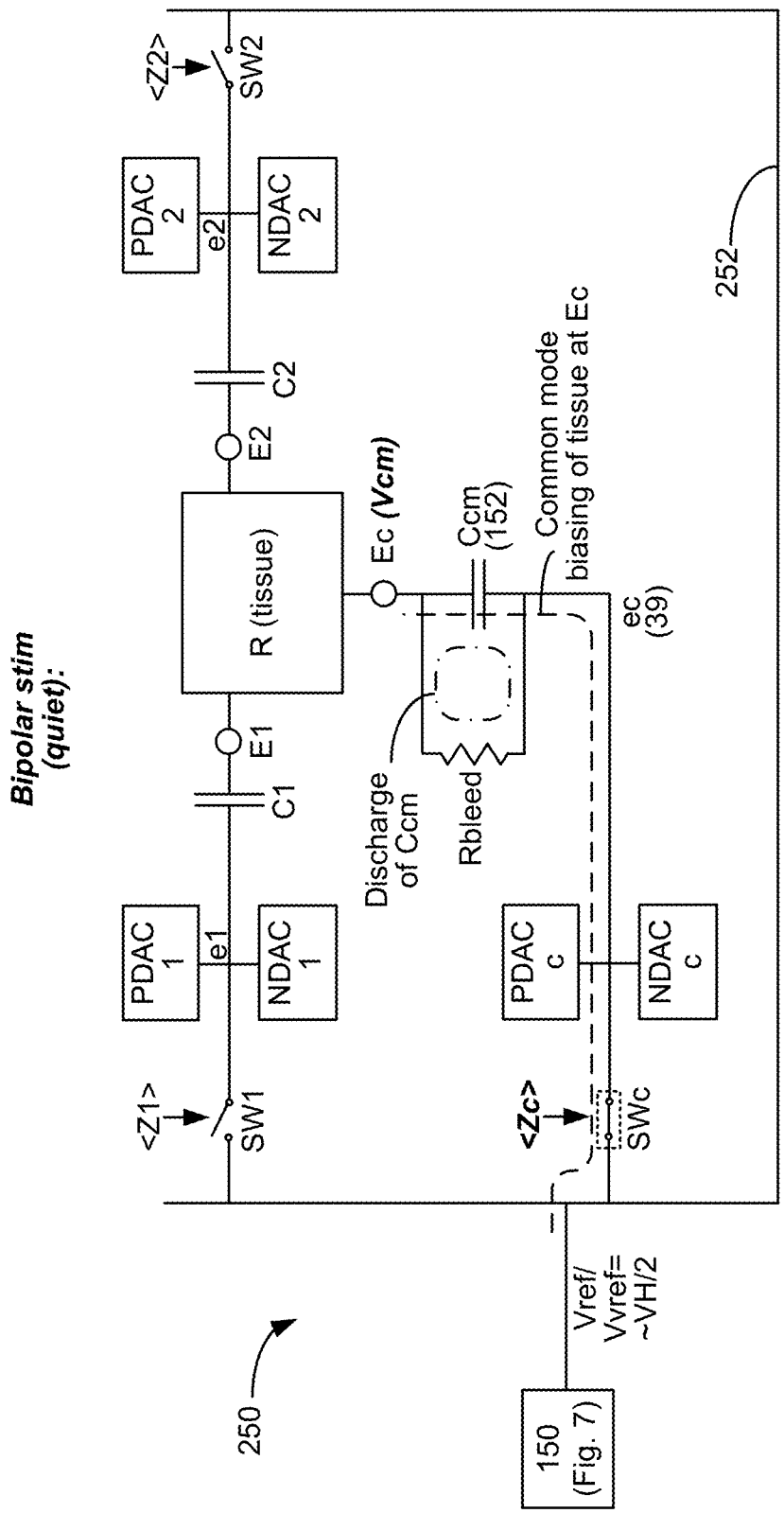

FIGS. 8 through 9D show an example of stimulation circuitry 250 in which the tissue biasing circuitry 150 as just described can be used to provide both a common mode voltage Vcm to the tissue to assist with sensing, and to provide a passive recovery voltage to the electrode nodes ei 39 during pulse phases 30c (FIG. 2A) when passive charge recovery is occurring. Stimulation circuitry 250 includes switches SWi connected between each electrode node 39 and a bus 252. In this regard, stimulation circuitry 250 is similar to the passive charge recovery circuitry described earlier (FIG. 3), where passive recovery switches PRi 41 are connected between each electrode node 39 and a bus 43 biased to a passive recovery voltage Vpr. However, switches SWi serve a dual purpose and are controlled both for the purpose of providing passive charge recovery, as well establishing a common mode voltage Vcm at the case electrode Ec, as explained further below. Switches SWi like the passive recovery switches PRi described earlier may have a variable resistance, and hence each switch may be control by a bus of control signals <Zi> to set the on resistance when these switches are closed.

Bus 252 preferably receives the output voltage from the tissue biasing circuitry 150. This output voltage, as explained earlier, can comprise Vref or Vvref depending whether OTA 180 (FIG. 7) is used, and in either case this voltage is approximately equal to VH/2 (~VH/2). (Approximately VH/2 should be understood as VH/2 varying in a range from 45% to 55% of VH). While use of biasing circuitry 150 is preferred to set the voltage on bus 252 for the beneficial reasons discussed with reference to FIG. 7, other voltage generator circuitry could be used as well. Biasing circuitry 150 may also simply comprise a DC voltage, such as Vbat provided by the battery 14.

FIGS. 9A-9D explain operation of stimulation circuitry 250, and how switches SWi can be controlled to allow bus 252 to both provide a common mode voltage Vcm to the tissue as is particularly useful during neural response sensing, and to provide a passive charge recovery voltage during passive charge recovery. Operation of circuitry 250 is described when providing bipolar stimulation, which in this example happens between lead-based electrodes E1 and E2, although other lead-based electrodes could be chosen to provide stimulation as well. The stimulation is preferably biphasic, comprising phases 30a and 30b as described earlier, thus providing active charge recovery. However, this is not strictly necessary, and monophasic pulses could be used as well, as explained further later. The case electrode Ec is used in this example to provide the common mode voltage Vcm to the tissue. FIG. 9A summarizes the status of switches SWi during active stimulation (e.g., during phases 30a and 30b, FIG. 9B), during passive charge recovery (30c, FIG. 9C), and during quiet periods (30d, FIG. 9D).

FIG. 9B shows configuration of the circuitry 250 during active stimulation (during phases 30a and 30b), and shows the various current paths that are formed. During active stimulation, P/NDAC1 and P/NDAC2 at electrode E1 and E2 are active and programmed to provide a current of amplitude I. Because the stimulation in this example is biphasic, these DACs are active at different times (see FIG. 2A), with PDAC1 and NDAC2 active during phase 30a, and PDAC2 and NDAC1 active during phase 30b. Because the DACs at these electrodes are active during active stimulation, switches SW1 and SW2 are opened to isolate the DAC from bus 252. Thus, <Z1> and <Z2> are not asserted, and electrode nodes e1 and e2 are decoupled from —VH/2 provided from biasing circuitry 150 on bus 252. By contrast, switch SWc associated with the case electrode Ec is closed during active stimulation via assertion of <Zc>. This routes —VH/2 via bus 252 from biasing circuitry 150 to electrode node ec connected to the bottom plate of the capacitor Ccm 152, which allows Vcm to form at the case electrode Ec to set the tissue voltage as explained previously. (Note that control signals <Xc> are preferably asserted to set the on resistance of SWc is set to its lowest value, although this isn't strictly required). Because Vcm is passively formed at the case electrode Ec, P/NDACc associated with the case electrode Ec are inactive.

FIG. 9C shows configuration of the circuitry 250 during passive charge recovery (30c), which as noted earlier is useful to recover any residual charge present in the previously-active current paths, such as might be stored on capacitors C1 and C2. During passive charge recovery, all of the DACs are inactive. Switches SW1 and SW2 associated with previously driven electrodes E1 and E2 are closed via assertion of <Z1> and <Z2> to couple electrode nodes e1 and e2 to —VH/2 on bus 252. As such, —VH/2 (i.e., Vref or Vvref) acts as the passive recovery voltage (akin to Vpr, FIG. 3) during passive charge recovery to promote the discharge of charge stored on capacitors C1 and C2 through the tissue R and bus 252. (Note that control signals <Z1> and <Z2> may be asserted such that the on resistance of switches SW1 and SW2 are set to a desired value. See U.S. Pat. Nos. 10,716,937). During passive recovery, switch SWc associated with the case electrode Ec can be opened, and hence control signals <Zc> may not be asserted. As such, the case electrode Ec is decoupled from ~VH/2 on bus 252, and the tissue R is left floating. Even though the switch SWc is not closed in FIG. 9C, note that the capacitor Ccm 152 associated with the case electrode Ec can still discharge if necessary through the bleed resistor Rbleed.

FIG. 9D shows configuration of the circuitry 250 during quiet periods 30d when neither active stimulation nor passive charge recovery is occurring. This configuration is similar to what occurred during active stimulation (FIG. 9B), except that none of the DACs are active. Switches SW1 and SW2 are open (<Z1> and <Z2> are not asserted), and SWc is closed (<Zc> asserted), which routes ~VH/2 to capacitor Ccm 152 to establish Vcm in the tissue R. Again, this assists with sensing of neural responses during the quiet periods (30d), and assists in maintaining Vcm in the tissue in preparation for the next active stimulation phase (pulse).

It is not strictly necessary to use the tissue biasing circuitry 150 described earlier. Instead, a more-generic voltage generator could simply provide a voltage to bus 252. However, the use of tissue biasing circuitry 150 is preferred due to its improved functionality as described earlier: for example, the use of the OTA 180 (FIG. 7) limits Icm to limit unwanted pocket stimulation, and monitoring circuitry 200 (FIG. 7) is useful in determining when to sense neural responses (S(en)) and when the compliance voltage VH (VH(en2)) may need to be increased.

The stimulation circuitry 250 of FIG. 8 works well as illustrated, and is convenient in that a single bus 252 and a single set of switches SWi are used for passive charge recovery and for setting the tissue voltage Vcm. However, circuitry 250 is not without shortcomings. First, and as discussed above, the common mode voltage Vcm is not established in the tissue at all times during the stimulation cycle, and in particular during passive charge recovery (FIG. 9C). Because the tissue voltage is uncertain and may be varying, neural sensing during passive charge recovery is made somewhat more difficult.

Second, stimulation circuitry 250 can have drawbacks when monopolar stimulation is used. As explained earlier, monopolar stimulation involves actively driving a current at the case electrode Ec (using P/NDACc) during active stimulation (30a and 30b). However, the case electrode Ec cannot be used to passively form Vcm in the tissue in this circumstance, because Ec can't be actively driven (by P/NDACc) and passively set (per 150) to Vcm at the same time. This is unfortunate, because certain therapies (e.g., DBS) tend to favor the use of monopolar stimulation, and may benefit from neural response sensing and therefore establishing Vcm in the tissue.

Figure 10:
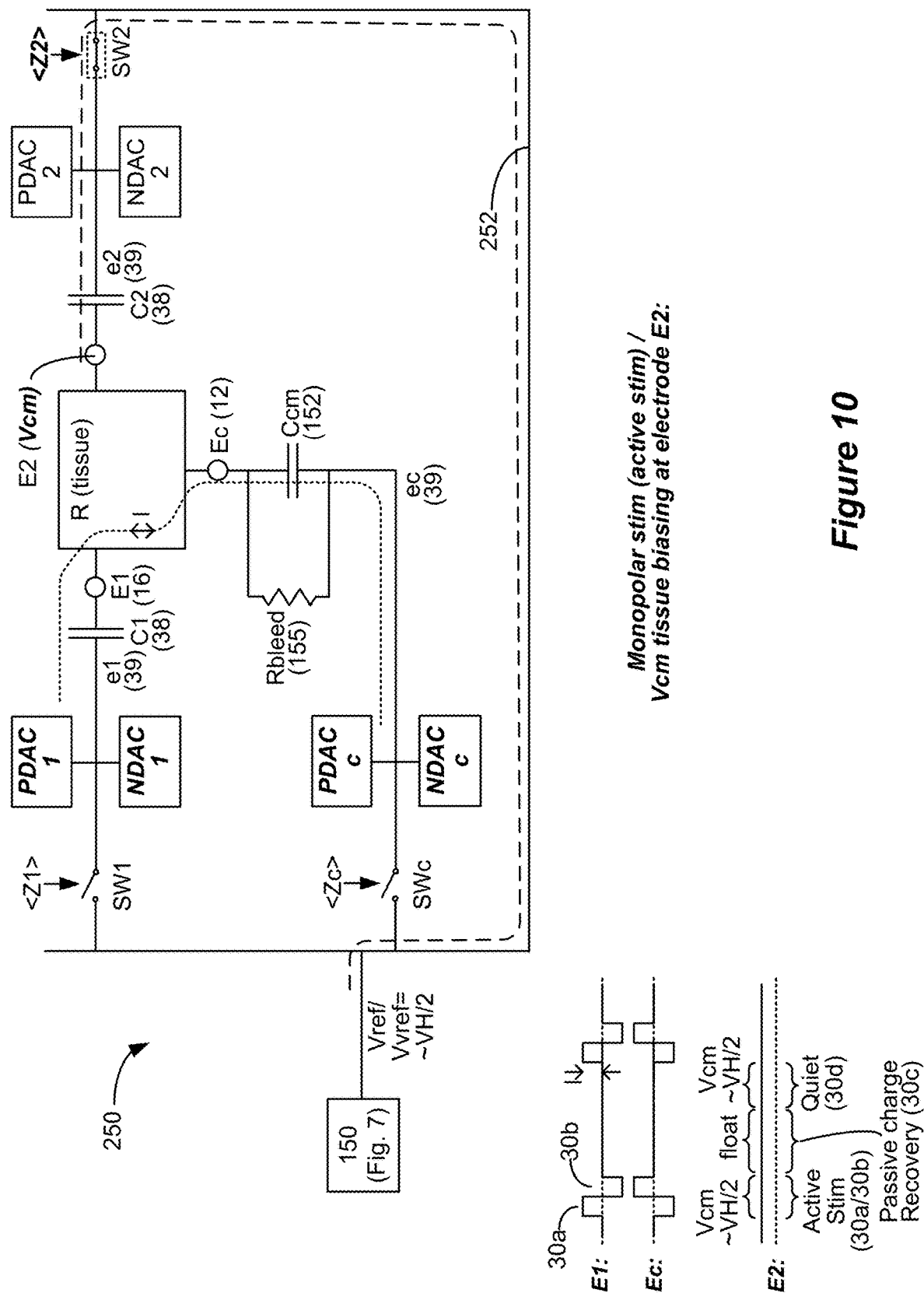
FIG. 10 shows operation of the stimulation circuitry of FIG. 8 when providing monopolar stimulation.

The above-incorporated '202 patent suggests that another lead-based electrode (not the case electrode Ec) can be used to provide Vcm to the tissue during monopolar stimulation, and FIG. 10 shows use of stimulation circuitry 250 in this manner. In this example, it is assumed that monopolar stimulation occurs by actively driving a lead-based electrode E1 (although one or more other lead-based electrodes could be chosen) and the case electrode Ec (using P/NDAC1 and P/NDACc). Lead based electrode E2 is selected (via SW2, <X2>) to provide Vcm to the tissue during active stimulation (although again any one or more lead-based electrodes could also be selected). Notice that the lead-based electrode E2 used in this example to provide Vcm to the tissue lacks a bleed resistor 155 across its capacitor C2. This can be problematic, because charge that builds on this capacitor C2 (or any other capacitor associated with a lead-based electrode used to provide Vcm) cannot be easily discharged. Compare FIG. 9C, where discharge of Ccm used to provide Vcm to the tissue at the case electrode Ec occurs passively affected via Rbleed. This problem could be mitigated by providing a bleed resistor Rbleed in parallel with C2 (not shown in FIGS. 8-10), and for that matter in parallel with Ci provided at all of the lead-based electrodes Ei in case these other electrodes are selected to provide Vcm to the tissue. But such a modification, while operable, is not preferred, as this potentially provides more than one DC path to the tissue through any of the bleed resistors. In short, such a modification would not guarantee that no DC current is injected into the tissue in the event of a fault, which may be unsafe.

Figure 11:
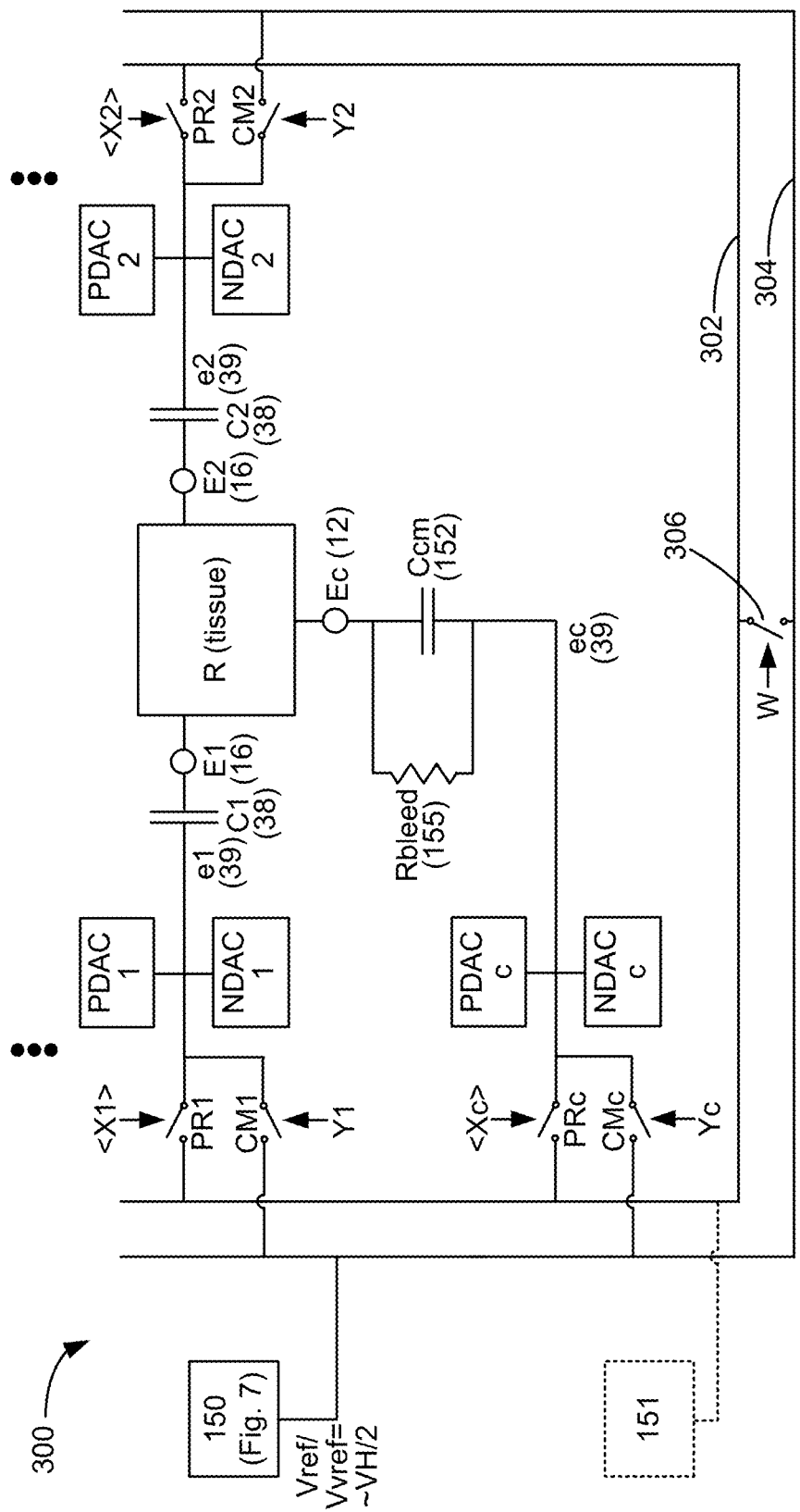
FIG. 11 shows a second example of stimulation circuitry using switches and two buses: one driven by the biasing circuitry to provide a voltage to set Vcm in the tissue, and one used for passive charge recovery.

Stimulation circuitry 300, as shown in FIG. 11, provide another example that addresses these concerns. As explained further below, circuitry 300 allows any one or more of the electrodes (the case electrode Ec and any of lead-based electrodes E1, E2, etc.) to be selected to provide a common mode voltage Vcm to the tissue. Further, circuitry 300 only includes a single bleed resistor, Rbleed, connected in parallel with the capacitor Ccm 152 connected to the case electrode Ec. Stimulation circuitry 300 thus includes only one DC path to the tissue, which as explained above promotes safety by effectively preventing DC current injection into the tissue through any electrode current path. That being said, Rbleed, while useful, is not strictly necessary in all examples of circuitry 300. Furthermore, circuitry 300 allows for the passive discharge of the capacitors used at lead-based electrodes to provide Vcm even if these capacitors lack bleed resistors in parallel, which is particular helpful when monopolar stimulation is used. Lastly, circuitry 300 also allows Vcm is be set in the tissue during all phases of stimulation, including during passive recharge. Thus, the tissue is never floating, which assists with neural response sensing.

Stimulation circuitry 300 includes two buses 302 and 304. Bus 304 comprises a common mode bus, and is driven with a voltage as necessary to form Vcm for the tissue R at one or more selected electrodes. Common mode bus 304 is connected to each of the electrode nodes ei by common mode switches CMi. Preferably these common mode switches have a set (low) on resistance, and thus may be controlled by single control signals Yi. The selection of these switches CMi by Yi dictate which of the one or more electrodes (E1, E2, , Ec) will act to provide Vcm to the tissue, as explained further below.

As before, it is preferable that tissue biasing circuitry 150 is used to drive the voltage on common mode bus 304. Use of tissue biasing circuitry 150 is preferred for the additional benefits it provides, as described earlier with reference to FIG. 7. As before, the voltage output from circuitry 150 (Vref or Vvref) is preferably ~VH/2, although this level can be varied. While use of biasing circuitry 150 is preferred to set the voltage on bus 304, other voltage generator circuitry could be used as well. Biasing circuitry 150 may also simply comprise a DC voltage, such as Vbat provided by the battery 14.

Bus 302 comprises a passive recovery bus, and is connected to passive recovery switches PRi connected to each of the electrode nodes ei. In this regard, bus 302 and passive recovery switches PRi are similar to what was described earlier with respect to FIG. 3. However, unlike passive recovery bus 43 of FIG. 3, bus 302 may not always be biased (e.g., to Vpr), and instead may be left to float during passive charge recovery, particularly when another electrode is selected to provide Vcm to the tissue, as explained further below. Each of the passive recovery switches PRi as before (FIG. 3) can be controlled by a group of control signals <Xi> to turn on these switches and to set their on resistances during passive charge recovery.

While passive recovery bus 302 is preferably unbiased when Vcm is provided to the tissue through a selected electrode, this bus 302 can also be biased at other times and under different circumstances, such as when Vcm is not being provided to the tissue. In this regard, note that it may not always be necessary to provide a common mode Vcm to the tissue: setting Vcm at the tissue is particularly useful if the IPG 100 will sense neural responses to stimulation, but setting Vcm is less important and may not occur if the IPG 100 will only be used to provide stimulation without neural response sensing. If Vcm is not being set in the tissue, it can be beneficial to bias passive recovery bus 302 with a particular voltage, in particular to allow passive charge recovery to occur.

FIG. 11 shows different examples of how passive recovery bus 302 can be biased if and when it is desired to do so, such as during passive charge recovery when Vcm is not set in the tissue. For example, and as shown optionally in dotted lines in FIG. 11, additional biasing circuitry 151 may be used to drive a voltage on bus 302, which may be similar in design to tissue biasing circuitry 150 (FIG. 7), or may comprise different voltage generator circuitry or another DC voltage such as Vbat.

Biasing circuitry 150 may also be used to bias bus 302 at particular times. In this regard, the stimulation circuitry 300 can include a switch 306 that intervenes between buses 304 and 302. This switch 306 when closed can route the voltage output from biasing circuitry 150 (~VH/2) from bus 304 to bus 302.

Figure 12:
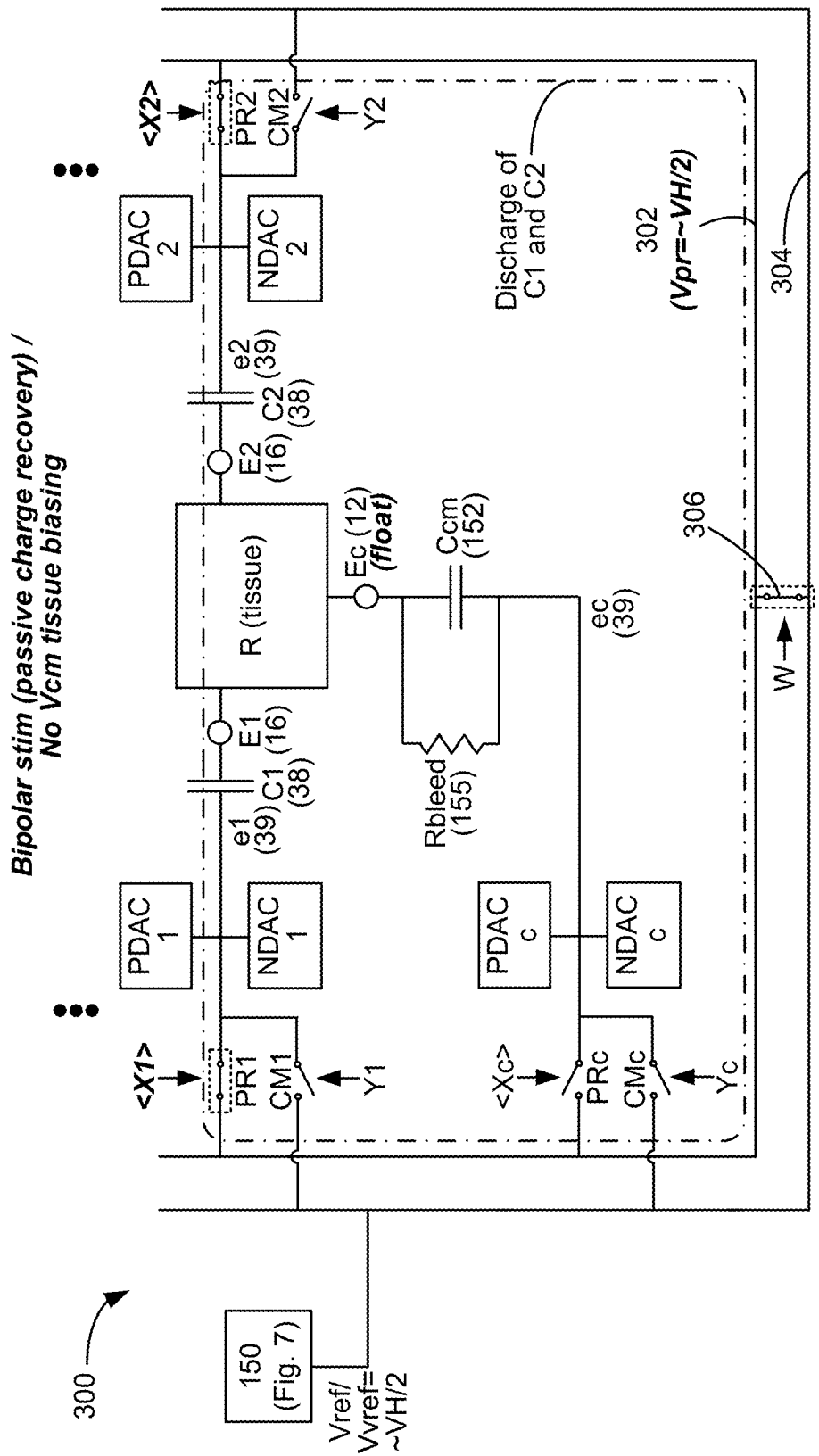
FIG. 12 shows operation of the stimulation circuitry of FIG. 11 when passive charge recovery is performed and Vcm is not being set in the tissue.

Providing a voltage to bus 302 (e.g., by circuitry 151 or by biasing circuitry 150 in conjunction with switch 306) allows this bus 302 to operate as described earlier (compare bus 43, FIG. 3) to provide passive charge recovery in a traditional manner. This is shown in FIG. 12 using biasing circuitry 150 and the closing of switch 306 using control signal W (although again additional biasing circuitry 151 could also have been used to bias bus 302). In this circumstance, it is assumed that Vcm is not being provided to the tissue during the stimulation cycle, perhaps because neural response sensing is unnecessary. Further, it is assumed that electrodes E1 and E2 were previously used to provide active stimulation (although this is just an example and any electrode including the case electrode could have been used to actively provide the stimulation), and therefore that it is desired to passively recovery any residual charge stored in these previously-active current paths (such as on capacitors C1 and C2). Such passive charge recovery can be accomplished using circuitry 300 by closing (via control signal W) switch 306 (to route ~VH/2 to bus 302), and by asserting control signals <X1> and <X2> to couple electrode nodes e1 and e2 to bus 302. In this regard, passive recovery bus 302 operates as did passive recovery bus 43 described earlier (FIG. 3), with biasing circuitry 150 providing ~VH/2 acting as the passive recovery voltage Vpr on bus 302.

Subsequent examples of the operation of stimulation circuitry 300 assume that a common mode voltage Vcm is provided to the tissue, presumably because neural response sensing will occur at some point. Such neural response sensing could happen for example during the second pulse phase 30b, see, e.g., U.S. Patent Application Publication 2020/0305745; during passive charge recovery 30c, see, e.g., PCT (Int'l) Patent Application Publication WO 2021/026151, or during quiet periods 30d. In these subsequent examples, it is assumed that passive recovery bus 302 is not biased (by circuitry 151 or circuitry 150/switch 306) but is instead left to float. Such biasing circuitry 150/151 and switch 306 are therefore not shown in subsequent drawings. It is assumed subsequently that tissue biasing circuitry 150 is used to bias common mode bus 304 (e.g., to ~VH/2), although as explained earlier another biasing source could be used as well.

Figure 13A:
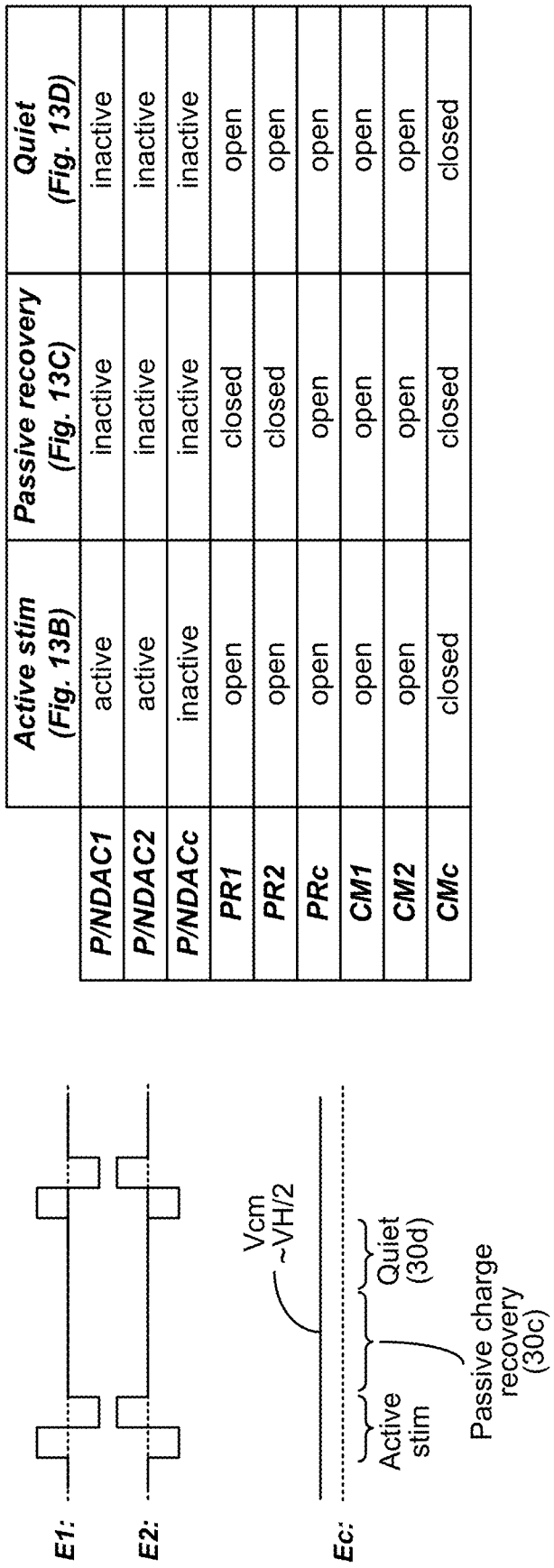
FIGS. 13A-13D show operation of the stimulation circuitry of FIG. 11 when providing bipolar stimulation, and describes configuration of the circuitry during various pulses phases.

FIGS. 13A-13D explain operation of stimulation circuitry 300 when providing bipolar stimulation, which as in earlier examples happens between lead-based electrodes E1 and E2. The stimulation pulses are shown as biphasic (30a and 30b), but as before monophasic pulses could be used as well, as is discussed in detail later with respect to FIGS. 15A and 15B. The case electrode Ec is used to provide the common mode voltage Vcm to the tissue. FIG. 13A summarizes the status of the various switches PRi and CMi during active bipolar stimulation (e.g., during phases 30a and 30b, FIG. 13B), during passive charge recovery (30c, FIG. 13C), and during quiet periods (30d, FIG. 13D).

Figure 13B:
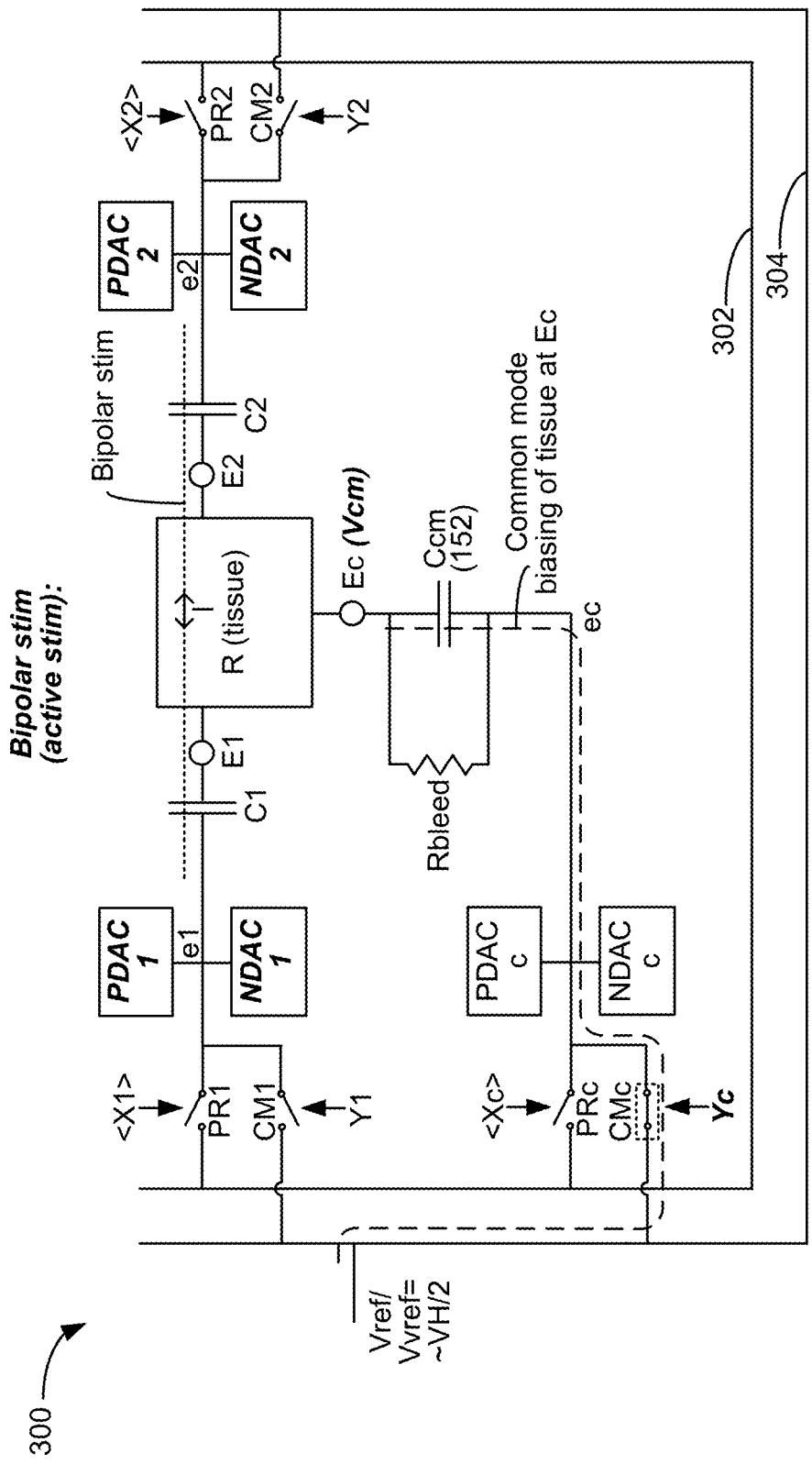

FIG. 13B shows configuration of the circuitry 300 during active stimulation (30a and 30b), and shows the various current paths that are formed. During active stimulation, P/NDAC1 and P/NDAC2 at electrode E1 and E2 are active and programmed to provide a current of amplitude I, which as noted earlier are active at different times depending on the phase (30a or 30b). Because the DACs at these electrodes are active during active stimulation, switches PR1, PR2, CM1, and CM2 are opened. That is, <X1>, Y1, <x2>, and Y2 are not asserted, and electrode nodes e1 and e2 are decoupled buses 302 and 304. By contrast, switch CMc associated with the case electrode Ec is closed during active stimulation via assertion of Yc. This routes —VH/2 from common mode bus 304 to electrode node ec connected to the bottom plate of the capacitor Ccm 152, which allows Vcm to form at the case electrode Ec to set the tissue voltage. Passive recovery switch PRc connected to electrode node ec is open, and <Xc> is not asserted to isolate ec from passive recovery bus 302. Because Vcm is passively formed at the case electrode Ec, P/NDACc associated with the case electrode Ec are inactive.

Figure 13C:
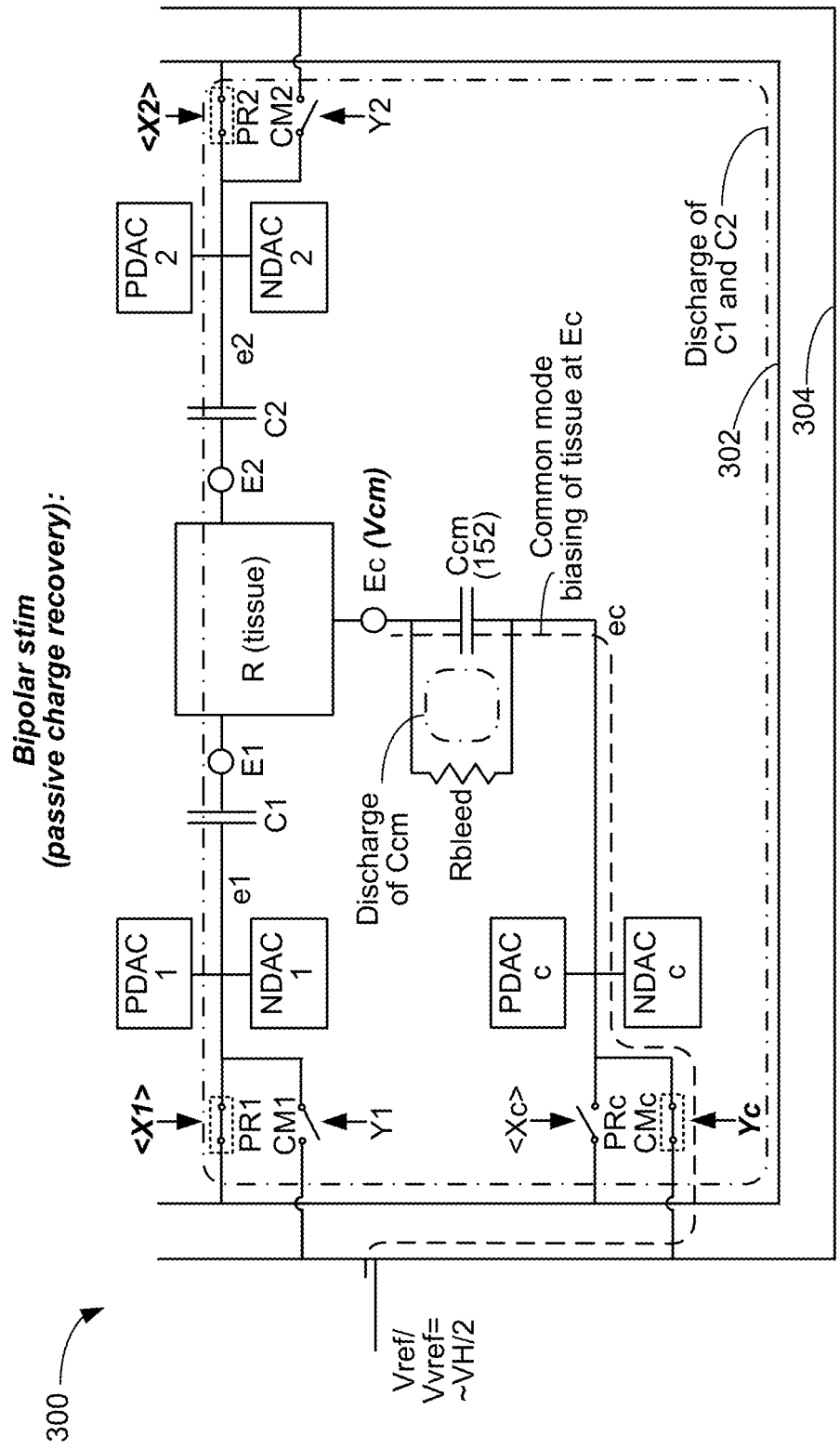

FIG. 13C shows configuration of the circuitry 300 during passive charge recovery (30c), and shows the various current paths that are formed. During passive charge recovery, all of the DACs are inactive. Passive recovery switches PR1 and PR2 associated with previously driven electrodes E1 and E2 are closed via assertion of <X1> and <X2> to couple electrode nodes e1 and e2 to passive recovery bus 302. This promotes the discharge of charge stored on capacitors C1 and C2 through the tissue R and bus 302. (Control signals <X1> and <X2> may be asserted to set the on resistance of PR1 and PR2 to a desired value).

During passive recovery, passive recovery switch PRc associated with the case electrode Ec can be opened, and hence control signals <Xc> are not be asserted, and thus this electrode is decoupled from bus 302. However, common mode switch CMc is closed via assertion of Yc to couple electrode node ec to common mode bus 304 (~VH/2). Therefore, and unlike stimulation circuitry 250 described earlier (FIG. 8), the tissue R is not left floating during passive charge recovery, but instead continues to be maintained at Vcm, as occurred during active stimulation (FIG. 13B) and as occurs during quiet periods (discussed shortly with respect to FIG. 13D). This assists in neural response sensing, because the tissue voltage is known (Vcm) and kept constant. Passive discharge through passive recovery bus 302 is thus referenced to Vcm via electrodes E1 and E2 which are also in contact with the tissue (~VH/2), hence the reason that passive charge recovery can occur without biasing passive recovery bus 302 with a voltage (like Vpr).

Figure 13D:
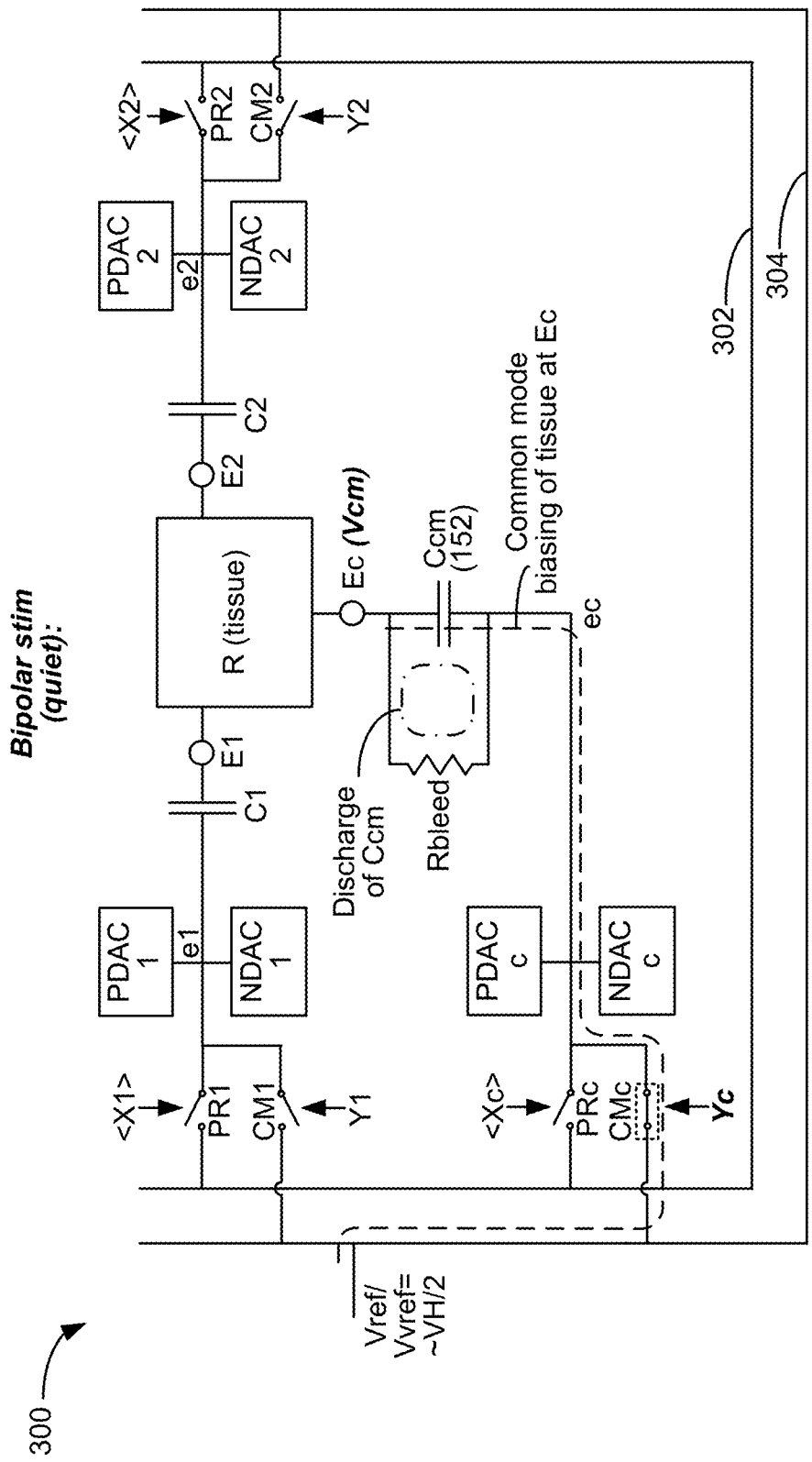

FIG. 13D shows configuration of the circuitry 300 during quiet periods 30d (FIG. 2A) when neither active stimulation nor passive charge recovery is occurring. This configuration is similar to what occurred during active stimulation (FIG. 13B), except that none of the DACs are active. All passive recovery switches PRi are open (the various control signals <Xi> are not asserted), as are the common mode switches CM1 and CM2 associated with previous-active electrodes E1 and E2 (Y1 and Y2 are not asserted). Common mode switch CMc associated with the case electrode Ec remains closed (Yc asserted), which continues to maintain Vcm in the tissue R. Again, this assists with sensing of neural responses during the quiet periods (30d), and assists in maintaining Vcm in the tissue in preparation for the next active stimulation phase (pulse). Notice also that the capacitor Ccm at the case electrode Ec can passively discharge through the bleed resistor Rbleed. To summarize, FIGS. 13A-13D show that stimulation circuitry 300 can hold the tissue R to the common mode voltage Vcm using the case electrode Ec during all relevant pulse phases.

Figure 14B:
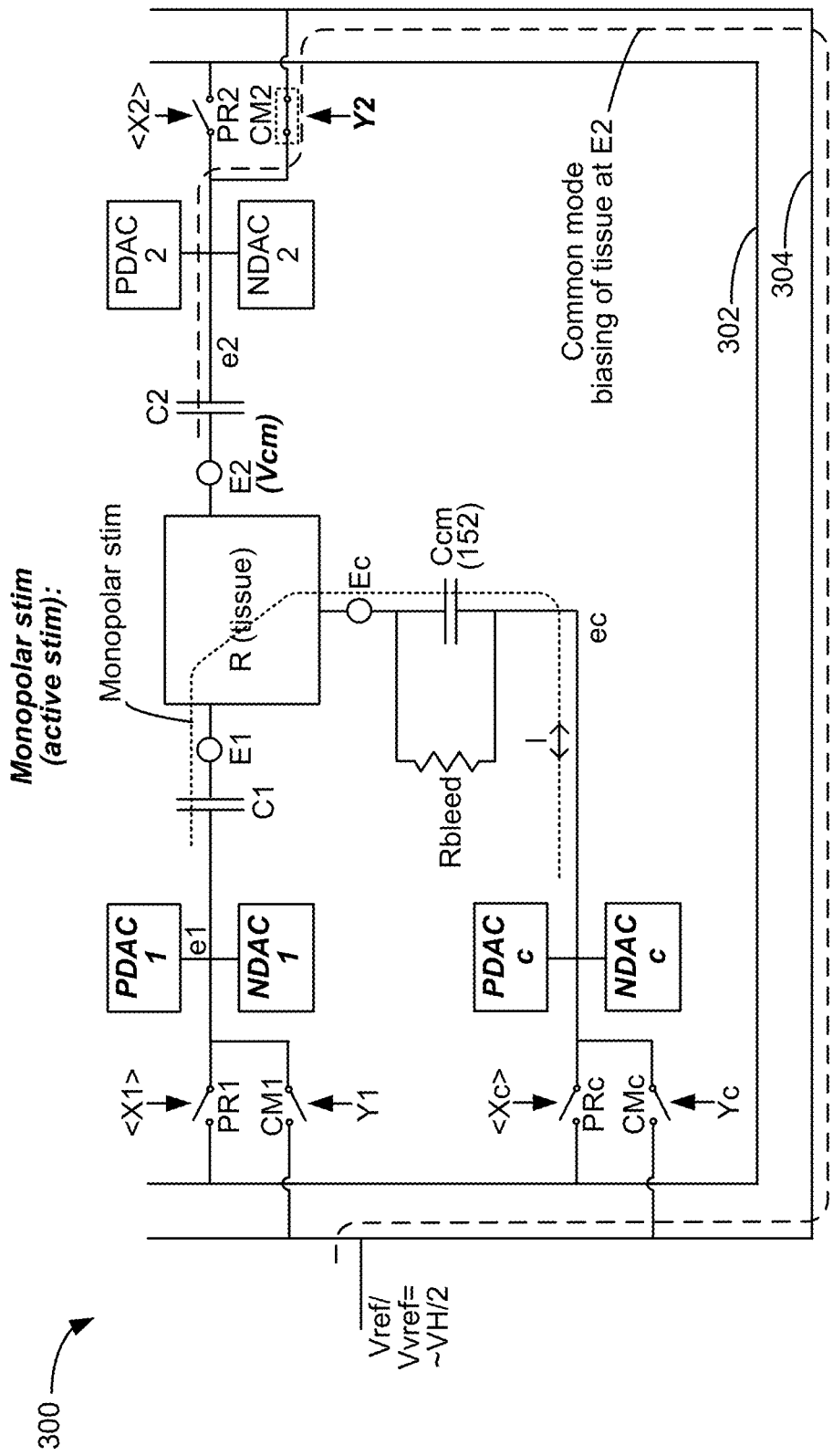

FIGS. 14A-14E show operation of the stimulation circuitry 300 during monopolar stimulation. Like the monopolar example discussed earlier (FIG. 10), it is assumed that monopolar stimulation is occurring by actively driving lead-based electrode E1 and the case electrode Ec (using P/NDAC1 and P/NDACc). Lead based electrode E2 is selected (via PR2, <X2>) to provide Vcm to the tissue, although again any one or more lead-based electrodes could be used. FIG. 14A summarizes the status of the various switches during active monopolar stimulation (e.g., during phases 30a and 30b, FIG. 14B), during passive charge recovery (30c, FIG. 14C), and during quiet periods (30d, FIGS. 14D-14E).

FIG. 14B shows configuration of the circuitry 300 during active stimulation (30a and 30b), and shows the various current paths that are formed. During active stimulation, P/NDAC1 and P/NDACc at electrodes E1 and Ec are active and programmed to provide a current of amplitude I, which as noted earlier are active at different times depending on the phase (30a or 30b). (As before, the stimulation pulses can be biphasic or monophasic). Because the DACs at these electrodes are active during active stimulation, switches PR1, PRc, CM1, and CMc are opened. That is, <X1>, Y1, <Xc>, and Yc are not asserted, and electrode nodes e1 and ec are decoupled from buses 302 and 304. By contrast, switch CM2 associated with electrode E2 is closed during active stimulation via assertion of Y2. This routes ~VH/2 from bus 304 to electrode node e2 connected to the bottom plate of the capacitor C2, which allows Vcm to form at electrode E2 to set the tissue voltage. Notice electrode E2, and all other lead-based electrodes for that matter, lack a bleed resistor in parallel with their capacitances Ci, which as noted earlier is preferred for safety. Capacitor C2 may charge somewhat during the as described earlier, just as case electrode capacitor Ccm did earlier, to help set Vcm in the tissue at electrode E2. Passive recovery switch PR2 connected to electrode node e2 is open, and <X2> is not asserted to isolate e2 from bus 302. Because Vcm is passively formed at electrode E2, P/NDAC2 associated with electrode E2 are inactive.

Figure 14C:
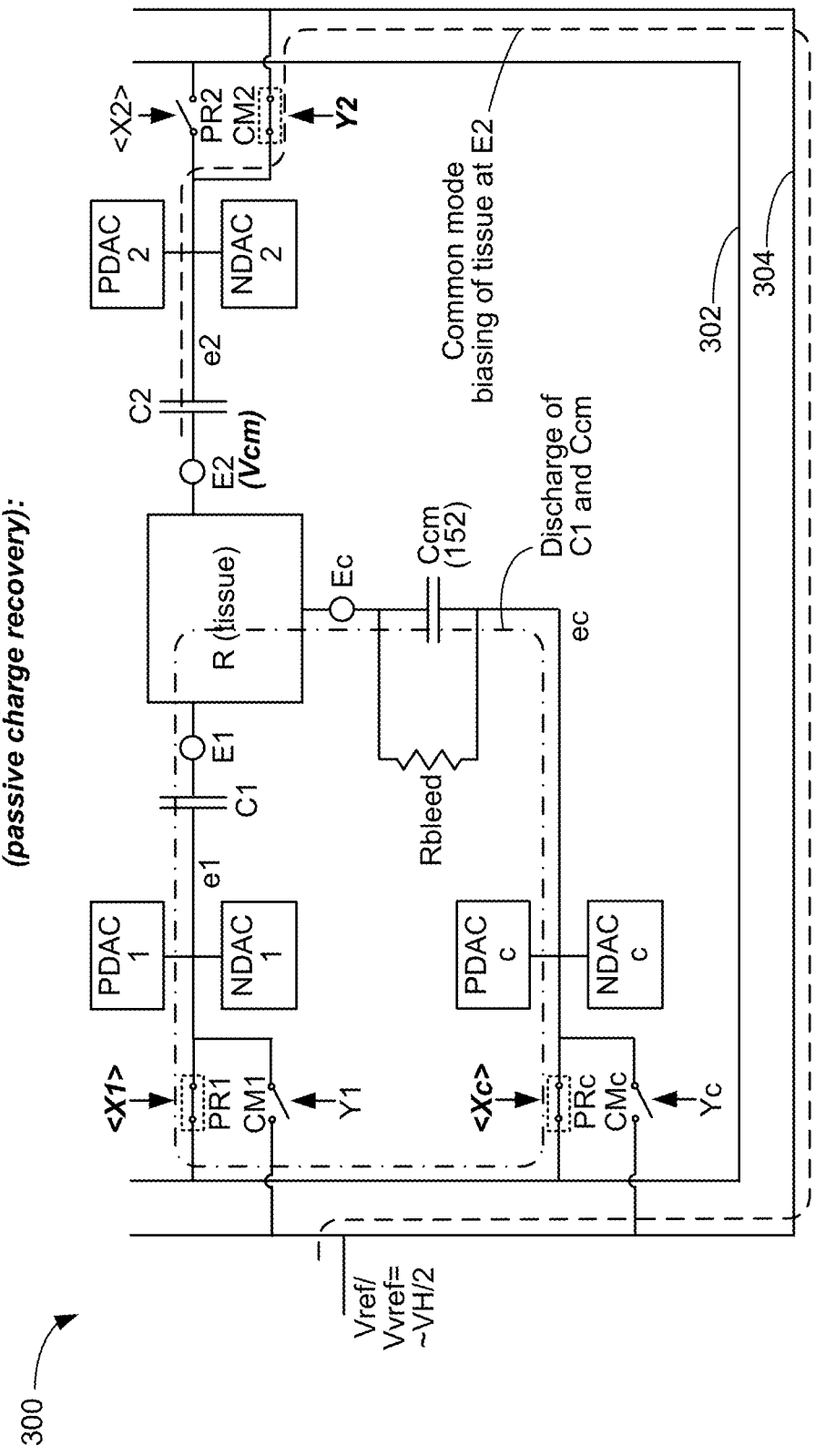

FIG. 14C shows configuration of the circuitry 300 during passive charge recovery (30c), and shows the various current paths that are formed. During passive charge recovery, all of the DACs are inactive. Passive recovery switches PR1 and PRc associated with previously driven electrodes E1 and Ec are closed via assertion of <X1> and <Xc> to couple electrode node e1 and ec to passive recovery bus 302. This promotes the discharge of charge stored on capacitors C1 and Cc through the tissue R and bus 302. (Control signals <X1> and <Xc> may be asserted to set the on resistance of PR1 and PR2 to a desired value).

During passive recovery, passive recovery switch PR2 associated with electrode E2 can be opened, and hence control signals <X2> are not be asserted, and thus this electrode is decoupled from bus 302. However, common mode switch CM2 is closed via assertion of Y2 to couple electrode node e2 to common mode bus 304 (~VH/2). In this way the tissue R is biased to Vcm at E2 and is not left floating during passive charge recovery, as occurred during active stimulation (FIG. 14B) and as occurs during quiet periods (discussed shortly with respect to FIGS. 14D and 14E). This assists in neural response sensing, because the tissue voltage is known (Vcm) and kept constant. Passive discharge through passive recovery bus 302 is thus referenced to Vcm via electrodes E1 and Ec which are also in contact with the tissue (~VH/2), hence the reason that passive charge recovery can occur without biasing passive recovery bus with a voltage (like Vpr).

Figure 14D:
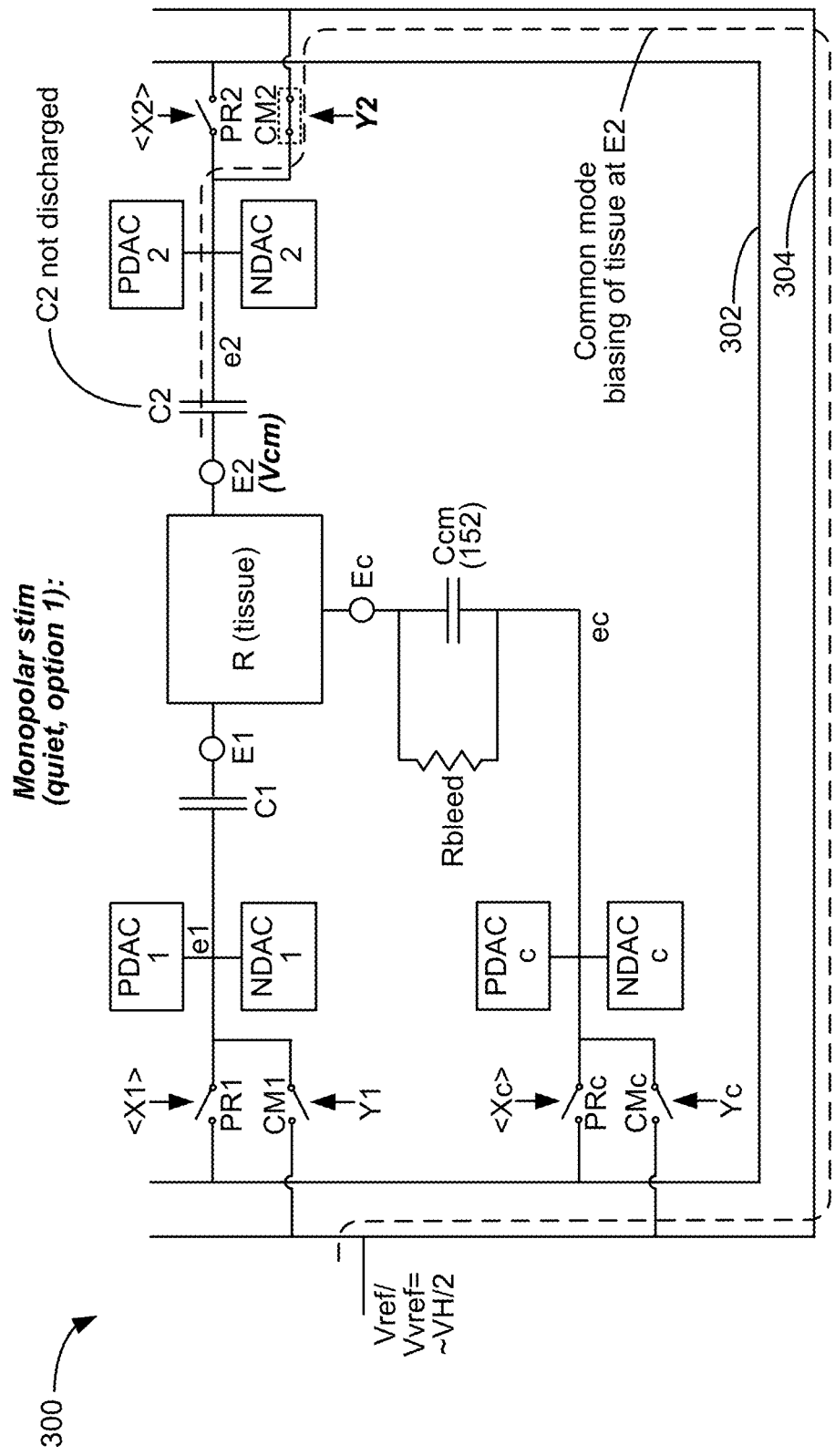
Figure 14E:
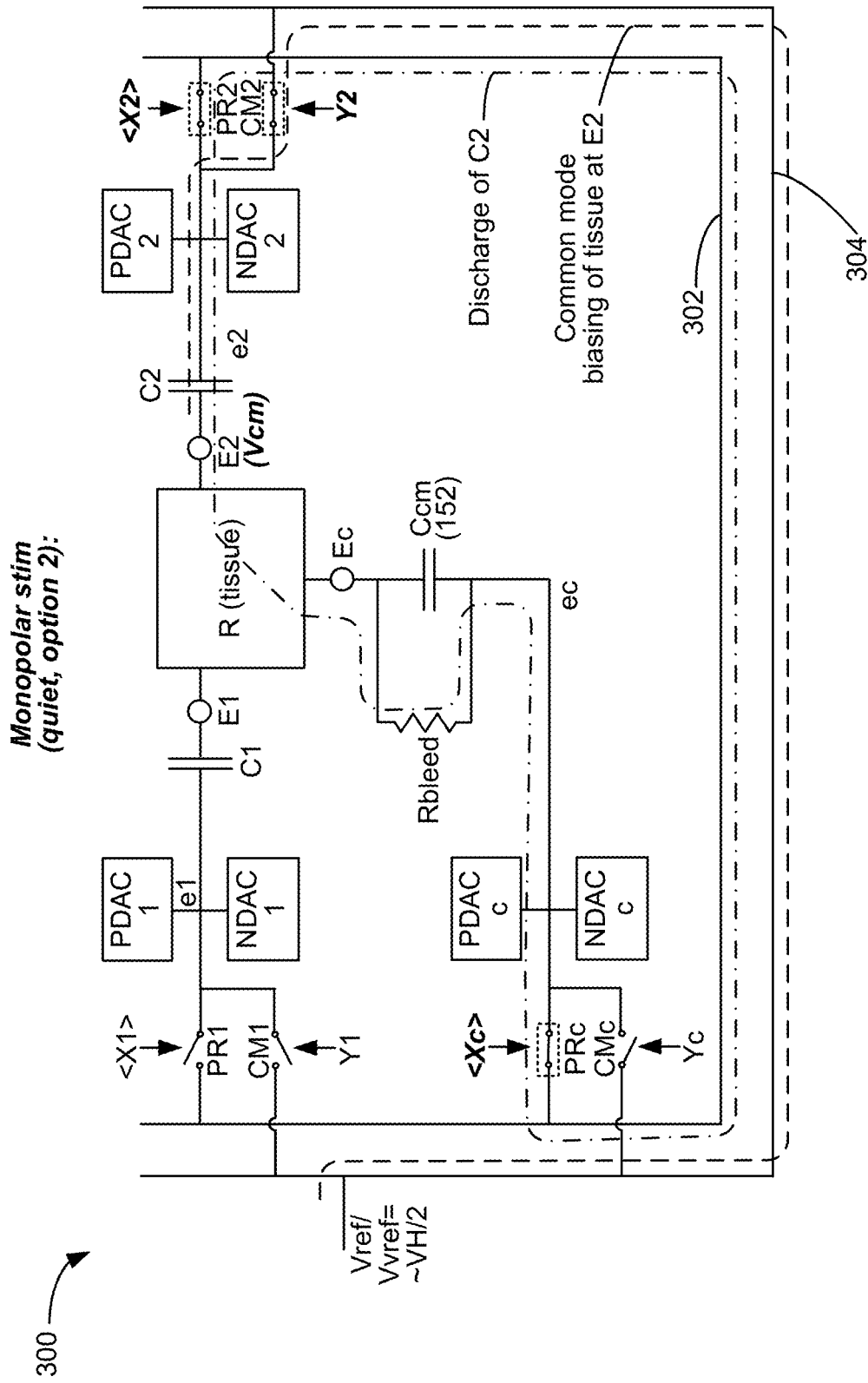

FIGS. 14D and 14E show different configurations of the circuitry 300 during quiet periods when neither active stimulation nor passive charge recovery is occurring. These options differ primarily in the extent to which they allow the capacitor (e.g., C2) at the lead-based electrode used to provide Vcm to the tissue (E2) to be discharged. In FIG. 14D, this common mode capacitor C2 is not discharged, and this can be preferable. The above-incorporated '202 patent explains that it can be useful to build charge (and hence a voltage Vc) across the common mode capacitor to set the tissue voltage to an optimal level (Vcm=Vc+VH/2) that varies somewhat from VH/2. This voltage may build to a steady state voltage over time (after some number of pulses), at which point Vcm in the tissue is optimally set. In short, it may not be desirable to discharge the common mode capacitance. On the contrary, it can also be useful to discharge capacitor C2, at least from time to time, as shown in FIG. 14E. For example, the charge stored on capacitor C2 may become excessive, and the voltage across it too large, which may affect circuit operation. Moreover, it may be useful to discharge common mode capacitance C2 if the stimulation changes—such as if electrode E2 later becomes an actively driven electrode as opposed to providing Vcm tissue biasing. FIGS. 14D and 14E therefore cover both of these contingencies, and allow the lead-based common mode capacitance to discharged or not.

FIG. 14D shows operation during the quiet period where the common mode capacitance (C2) used to provide Vcm is not discharged. This configuration is similar to what occurred during active stimulation (FIG. 14B), except that none of the DACs are active. All passive recovery switches PRi are open (the various control signals <Xi> are not asserted), as are the common mode switches CM1 and CMc associated with previous-active electrodes E1 and Ec (Y1 and Yc are not asserted). Common mode switch CM2 associated with electrode E2 remains closed (Y2 asserted), which continues to maintain Vcm in the tissue R at that electrode without discharging C2. Again, this assists with sensing of neural responses during the quiet periods (30d), and assists in maintaining Vcm in the tissue in preparation for the next active stimulation phase (pulse).

FIG. 14E shows operation during the quiet period where the common mode capacitance (C2) used to provide Vcm is discharged. Different options are possible here to discharge C2. In the example shown, switch CM2 continues to be closed and therefore Vcm continues to be provided to the tissue via electrode E2. However, the passive recovery switch PR2 at this electrode is also closed, along with one or more of the passive recovery switches at the other electrodes. In this example, PRc associated with the case electrode Ec is closed. Electrode node e2 and ec are thus both coupled to passive charge recovery bus 302, which allows C2 to discharge through electrode E2 and Ec, the tissue, and bus 302. Even though the passive recovery bus 302 is used to recover charge stored on C2, passive charge recovery at the previously-used active electrode (E1 and Ec) is not actually occurring (this occurred earlier in FIG. 14C). Still other passive recharge switches PRi could be closed here, such as PR1 at electrode E1. Indeed, all passive recharge switches PRi could be closed, thus connecting all electrode nodes to the bus 302 to assist in discharging C2 when E2 acts to provide the common mode voltage Vcm to the tissue. In any event, even with this option, Vcm is still maintained in the tissue during the quiet period via common mode bus 304, switch CM2, and electrode E2. Note however that Vcm may change slightly as capacitor E2 is discharged, but this small change should not affect neural response sensing.

Figure 15A:
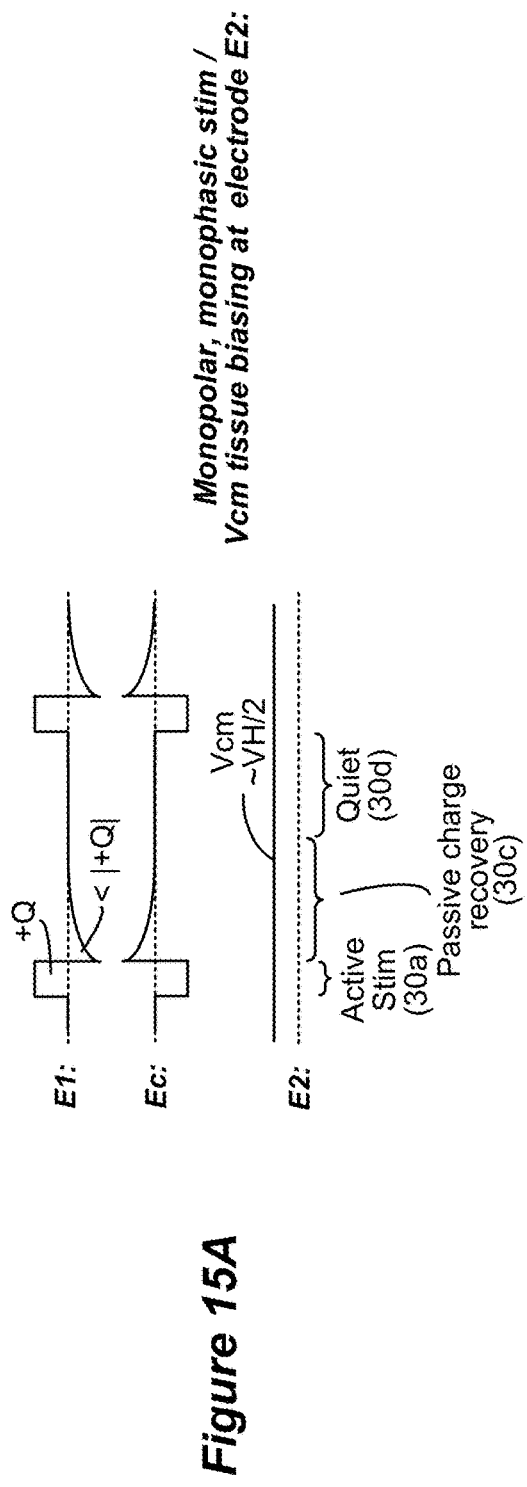
FIGS. 15A and 15B show considerations when operating the stimulation circuitry of FIG. 11 to provide monophasic stimulation, and in particular when providing such monophasic stimulation in a monopolar fashion.
Figure 15A:
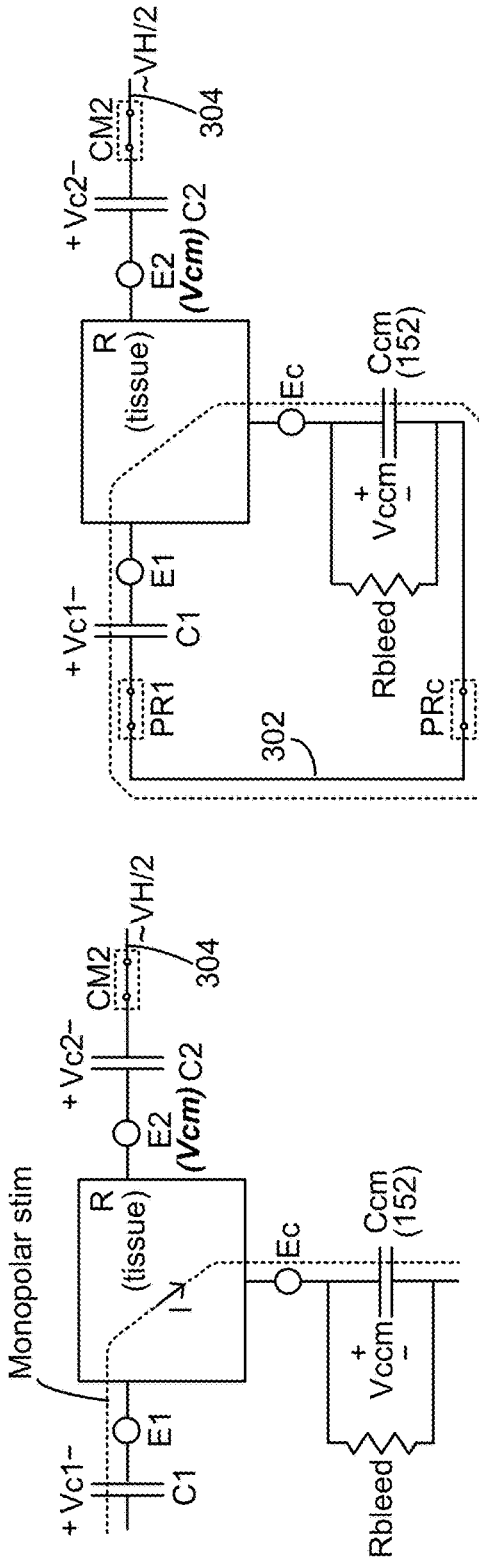
Figure 15B:
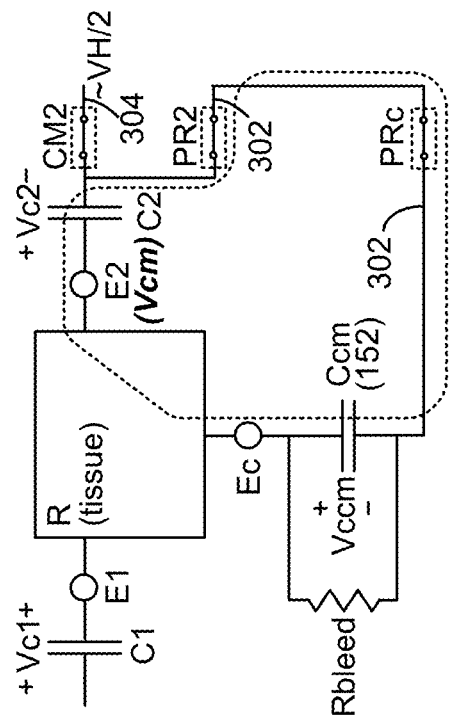

As noted earlier, the pulses provided during active stimulation via stimulation circuitries 250 or 300 can be monophasic. (More generally, active stimulation can involve any number of active stimulation phases, whether monophasic, biphasic, triphasic, and so on). Given its importance to certain stimulation therapies (e.g., DBS), the use of monophasic stimulation is explained further in the context of circuitry 300 in FIGS. 15A and 15B. As described earlier and shown in FIG. 15A, monophasic stimulation involves actively driving (using P/NDAC circuitry) a single phase (30a) without use of a following actively-driven phase of opposite polarity (like 30b) to recover charge. FIGS. 15A and 15B show monophasic stimulation in the context of monopolar stimulation (again, as is particularly important in DBS therapy), in which stimulation occurs between at least one lead-based electrode (e.g., E1) and the case electrode Ec (similar to what occurred in FIGS. 14A-14E). However, monophasic bipolar stimulation (similar to what occurred in FIGS. 13A-13D) would be similar.

When providing monophasic, monopolar stimulation, circuitry 300 operates similarly to when biphasic stimulation was used (FIGS. 14A-14E), and generally the same switches are closed at the same times during the active (30a), passive (30c), and quiet (30d) pulses phases. Monophasic stimulation however runs a higher risk of accumulating charge that can affect setting of the common mode voltage Vcm in the tissue R. This doesn't affect the efficacy of circuitry 300 operation and would not significantly affect neural response sensing, but is still noteworthy and explained briefly.

Monophasic stimulation may more likely accumulate charge because the passive charge recovery phase (30c) may not (at least initially) recover all of the charge injected during the active phase (30a). For example, during the active stimulation phase 30a, as shown in FIG. 15A, the monophasic pulse injects a charge of +Q, which will charge capacitors C1 (Vc1) and Ccm (Vccm) in the active electrode paths at E1 and Ec. As before, lead-based electrode E2 is used to provide the common mode voltage Vcm to the tissue, which may cause capacitor C2 slightly charge (Vc2) as discussed earlier.

During the passive charge recovery phase (30c), as also shown in FIG. 15A, the electrode nodes at these previously-active electrodes E1 and Ec are shorted to bus 302 via closing of switches PR1 and PRc, which causes an opposite polarity current to flow. This current will exponentially decay in accordance with the RC time constant, and in accordance with the degree to which the capacitors in the passive recharge loop (bus 302) are charged (Vc1 and Vccm), because these voltages provide the electromotive force that permits the current to flow. The amount of charge passively recovered during 30c depends on these factors as well as how long the passive recovery switches PR1 and PRc are closed. It is likely at least initially that the entirety of the actively-injected charge Q+ will not be recovered (<I+QI)

during the passive charge recovery phase 30c. Therefore, some residual voltage will still be still present across the capacitors (Vc1 and Vccm) at the end of this phase. Over time--as more pulses are issued--this unrecovered charge and voltages Vc1 and Vccm will grow. As the voltage increases, so does the electromotive force implicated during passive charge recovery, thus allowing more charge to be recovered during subsequent periods 30c. Eventually, after some number of pulses, these voltages Vc1 and Vccm will have increased to an equilibrium point where the passive charge recovery period 30c is able to completely recovery the charge (-Q) injected during the active phase 30a (+Q). This build up of voltages Vc1 and Vccm is not problematic to operation of the circuitry 300 or to the stimulation therapy provided; if necessary, the compliance voltage VH will be increased via a feedback mechanism described earlier (FIG. 3) to compensate for the larger voltage on the capacitors. See U.S. Pat. No. 10,792,491.

Nevertheless, the fact that the capacitors C1 and Ccm remain charged to some degree can affect the common mode voltage Vcm formed in the tissue, i.e., via capacitor C2 at electrode E2. This is shown in FIG. 15B, in the circumstance where it is desired to discharge capacitor C2 during the quiet phases (30d), as explained earlier with reference to FIG. 14E. In this circumstance, discharging capacitor C2 involves connecting this capacitor and another--such as Ccm--to bus 302 via switches PR2 and PRc. This essentially places these capacitors C2 (Vc2) and Ccm (Vccm) in parallel, which can cause a current to flow to equilibrate the charges on these capacitances. However, capacitor C2 this may not completely discharge through this process. In fact, and depending on the magnitude and polarity of Vccm as eventually established during passive charge recovery (30c) once equilibrium is reached, capacitor C2 may charge further during this quiet period (i.e., the absolute value of Vc2 may increase; however it may also decrease). Regardless, because Vccm can affect Vc2, the voltage Vcm formed in the tissue can be affected, because Vcm=Vc2+VH/2.

In short, just as Vccm reaches a steady state over some period of time, so too will Vcm. Nevertheless, Vc2, and hence Vcm, will change relatively slowly and steadily. As such, neural response sensing will not be substantially affected as the sense amp circuitry 110 (FIG. 5) can more easily filter such slow acting transients in the tissue.

FIG. 16 summarizes the various control signals that can be provided to stimulation circuitry 300, including the common mode control signals Yi used to control the common mode switches CMi at each of the electrode nodes; the passive recovery control signals <XI> used to the passive recovery switches PRi at each of the electrode nodes; and control signal W to control switch 306 (FIGS. 11 and 12). These control signals may issue from the IPG 100's control circuitry 102 as shown, along with other control signals used to activate the relevant DACs to provide the stimulation at the selected electrodes with the prescribed amplitudes. These control signal may comprise some of the signals within bus 118 described earlier (FIG. 5).

FIG. 17 shows representations of the IPG 100, including the various lead-based electrodes (e.g., E1-E16) and the case electrode, and shows different variations by which these electrodes can be selected to provide stimulation or to provide common mode voltage Vcm to the tissue. Because Vcm is preferably provided to the tissue to assist with neural response sensing, still further electrodes are shown that operate as sensing electrodes. (Because neural response sensing is preferably differential, two sensing electrodes are shown, although only one sensing electrode could be used in other examples). Certain of the electrodes may also be inactive, and are not selected for stimulation, sensing, or to provide the common mode voltage to the tissue. Different shadings are shown in FIG. 17 for these different electrode functions. The foregoing description explains how and when the various switches in stimulation circuitry 300 should be closed to affect the different examples shown in FIG. 17.

Examples (a)-(c) show different examples of bipolar stimulation. Example (a) shows bipolar stimulation at two active lead-based electrodes (one anode, one cathode, such as during one of phases 30a or 30b), and use of the case electrode to provide Vcm, similar to what was shown in FIGS. 13A-13D. In example (b), more than two lead-based electrodes are selected to provide stimulation, possibly on different leads as shown. In example (c), some of the lead-based electrodes are also selected to operate (along with the case electrode Ec) to provide Vcm. This may be preferable to establish Vcm closer to electrodes where stimulation and sensing are occurring. In fact, all otherwise inactive electrodes (i.e., those not used for providing stimulation or for sensing) may provide Vcm to the tissue, as shown in example (d).

Examples (e) and (f) show different examples of monopolar stimulation, in which an active current is driven at the case electrode Ec (shown here as a cathode) and at at least one lead-based electrode. In example (e), one lead-case electrode is also selected (as an anode) to provide active stimulation, and one lead-based electrode is selected to provide Vcm to the tissue, similar to what was shown in FIGS. 14A-14E. Example (f) is similar except that more than one lead-based electrode is selected to provide stimulation (all selected as anodes). Again, more than one lead-based electrode can be used to provide Vcm to the tissue, and in example (g) all such inactive lead-based electrodes are used for this purpose.

Example (h) shows stimulation that is not strictly bipolar or monopolar. Here, the case electrode Ec is actively driven (as a cathode) as occurs in monopolar stimulation, but other lead-based electrodes are also driven with the same polarity (also as cathodes). Nevertheless, Vcm may still be provided to the tissue at any of the inactive lead-based electrodes, or all of them (although this isn't shown for example (h)).

While various examples of the stimulation circuitry are described as being useful to provide a common mode voltage to the tissue for the purpose of sensing neural responses to stimulation, the disclosed circuits can also be used to bias the tissue for other reasons, not related to neural response sensing.

Although particular embodiments of the present invention have been shown and described, the above discussion is not intended to limit the present invention to these embodiments. It will be obvious to those skilled in the art that various changes and modifications may be made without departing from the spirit and scope of the present invention. Thus, the present invention is intended to cover alternatives, modifications, and equivalents that may fall within the spirit and scope of the present invention as defined by the claims.

What is claimed is:

1. A stimulator device configured to provide stimulation with a first phase and a second phase, comprising:
   a plurality of electrode nodes, wherein each of the electrode nodes is coupleable to a different electrode configured to contact a patient's tissue;
   driver circuitry configurable to drive at least two of the electrode nodes during the first phase to provide a current through the tissue;

a first bus configured to receive a bias voltage from biasing circuitry;

a plurality of first switches, wherein each of the first switches is connected between a different one of the electrode nodes and the first bus;

a second bus;

a plurality of second switches, wherein each of the second switches is connected between a different one of the electrode nodes and the second bus; and control circuitry configured to close at least one of the first switches to provide a common mode voltage to the tissue, and close the second switches connected to the at least two electrode nodes during the second phase, wherein the second phase comprises a passive recovery phase to recover charge stored in current paths of the at least two electrodes.

2. The stimulator device of claim 1, further comprising a plurality of DC-blocking capacitors, wherein each of the DC-blocking capacitors is connected in series between one of the electrode nodes and a different one of the electrodes.

3. The stimulator device of claim 2, further comprising a resistor in parallel across only one of the DC-blocking capacitors, wherein the control circuitry is configured to close only one of the first switches, wherein the only one first switch is connected to the DC-blocking capacitor having the resistor in parallel.

4. The stimulator device of claim 1, wherein the control circuitry is further configured to open the second switches during the first phase.

5. The stimulator device of claim 1, wherein the control circuitry is further configured to close the at least one of the first switches during the second phase to provide the common mode voltage to the tissue.

6. The stimulator device of claim 1, wherein the control circuitry is further configured to close the at least one of the first switches during the first phase to provide the common mode voltage to the tissue.

7. The stimulator device of claim 1, wherein the stimulation further comprises a third phase, wherein the control circuitry is further configured to close the at least one of the first switches during the third phase to provide the common mode voltage to the tissue.

8. The stimulator device of claim 7, wherein the third phase comprises a quite phase when the driver circuitry is not active.

9. The stimulator device of claim 7, wherein the control circuitry is further configured to open the second switches during the third phase.

10. The stimulator device of claim 7, wherein the control circuitry is configured during the third phase to close second switches connected to the electrode nodes connected to the at least one of the first switches, and to close at least one second switch connected to at least one of the two electrode nodes.

11. The stimulator device of claim 1, wherein the second bus is not biased by circuitry during the second phase.

12. The stimulator device of claim 1, wherein the stimulation comprises a plurality of phases during the first phase.

13. The stimulator device of claim 12, wherein the stimulation is biphasic during the first phase comprising two phases of opposite polarities.

14. The stimulator device of claim 1, wherein the stimulation is monophasic during the first phase.

15. The stimulator device of claim 1, further comprising a case implantable in the tissue and comprising a conductive portion, wherein one of the electrodes comprises the conductive portion operating as a case electrode, and further comprising at least one lead, wherein at least some of the electrodes are on the at least one lead operating as lead-based electrodes.

16. The stimulator device of claim 15, wherein the stimulation is monopolar during the first phase to provide the current between the case electrode and at least one of the lead-based electrodes, and wherein the common mode voltage is provided to the tissue at one or more of the lead-based electrodes.

17. The stimulator device of claim 15, wherein the stimulation is bipolar during the first phase to provide the current between at least two of the lead-based electrodes, and wherein the common mode voltage is provided to the tissue at the case electrode.

18. The stimulator device of claim 1, wherein the driver circuitry is powered by a compliance voltage, wherein the bias voltage is a function of the compliance voltage.

19. The stimulator device of claim 1, further comprising neural response detection circuitry coupled to the electrode nodes, wherein the neural response detection circuitry is configured to measure a neural response to the current at one or more of the electrode nodes.

* * * * *